US011002998B2

(12) United States Patent
Hopkin et al.

(10) Patent No.: US 11,002,998 B2
(45) Date of Patent: May 11, 2021

(54) ENHANCED PRIVACY SWITCHABLE BACKLIGHT SYSTEM

(71) Applicant: Sharp Kabushiki Kaisha, Osaka (JP)

(72) Inventors: Hywel Hopkin, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 16/263,305

(22) Filed: Jan. 31, 2019

(65) Prior Publication Data

US 2020/0249504 A1 Aug. 6, 2020

(51) Int. Cl.
| | |
|---|---|
| *G02F 1/13* | (2006.01) |
| *G02F 1/13357* | (2006.01) |
| *F21V 8/00* | (2006.01) |
| *G09G 3/34* | (2006.01) |
| *G02F 1/1335* | (2006.01) |

(52) U.S. Cl.
CPC ......... *G02F 1/1323* (2013.01); *G02B 6/0031* (2013.01); *G02B 6/0041* (2013.01); *G02B 6/0076* (2013.01); *G02F 1/133602* (2013.01); *G09G 3/3426* (2013.01); *G02F 1/133626* (2021.01); *G02F 2203/62* (2013.01); *G09G 2320/068* (2013.01)

(58) Field of Classification Search
CPC ............ G09G 3/3426; G09G 2320/068; G02F 2001/133626; G02F 1/1323
See application file for complete search history.

(56) References Cited

U.S. PATENT DOCUMENTS

| | | | | |
|---|---|---|---|---|
| 5,956,107 A | * | 9/1999 | Hashimoto | ........... G02F 1/1323 349/64 |
| 8,582,055 B2 | * | 11/2013 | Kawai | .................. G02B 6/0055 349/65 |
| 9,881,531 B2 | | 1/2018 | Klippstein et al. | |
| 2003/0043315 A1 | * | 3/2003 | Umemoto | ......... G02F 1/133615 349/65 |

(Continued)

OTHER PUBLICATIONS

Jae-Won Huh et al.: "Ion-doped liquid-crystal cell with low opaque-state specular transmittance based on electro-hydrodynamic effect", Dyes and Pigments 150, pp. 16-20, 2018, https://doi.org/10.1016/j.dyepig.2017.11.001.

*Primary Examiner* — Michael H Caley
*Assistant Examiner* — Jonathan Y Jung
(74) *Attorney, Agent, or Firm* — Renner, Otto, Boisselle & Sklar, LLP

(57) ABSTRACT

A backlight system controls a viewing angle in a switchable privacy display system that achieves a strong private mode and enhanced brightness in the private and public modes as compared to conventional configurations. The backlight system includes a first backlight unit that emits light from a non-viewing side of the backlight system toward a viewing side of the backlight system; a second backlight unit located on a viewing side of the first backlight unit that emits light toward the viewing side of the backlight system; and a privacy optic that includes a liquid crystal material and is located on a non-viewing side of the second backlight unit and between the first backlight unit and the second backlight unit, wherein the privacy optic operates to transmit light from the first backlight unit in a limited viewing angle range.

13 Claims, 22 Drawing Sheets

(56) References Cited

U.S. PATENT DOCUMENTS

| | | | |
|---|---|---|---|
| 2006/0109396 A1* | 5/2006 | Tsai | G02B 6/0038 |
| | | | 349/65 |
| 2006/0193999 A1* | 8/2006 | Verall | C09K 19/2007 |
| | | | 428/1.1 |
| 2012/0235891 A1* | 9/2012 | Nishitani | G02B 6/0076 |
| | | | 345/102 |
| 2015/0268495 A1* | 9/2015 | Kizaki | G02F 1/133784 |
| | | | 349/33 |
| 2016/0357046 A1* | 12/2016 | Choi | G02B 6/005 |
| 2017/0153383 A1* | 6/2017 | Lee | G02B 6/0076 |
| 2017/0176652 A1* | 6/2017 | Wheatley | G02B 5/02 |
| 2017/0329073 A1* | 11/2017 | Liu | G02F 1/133528 |
| 2018/0199406 A1* | 7/2018 | Wang | G02F 1/1336 |

\* cited by examiner

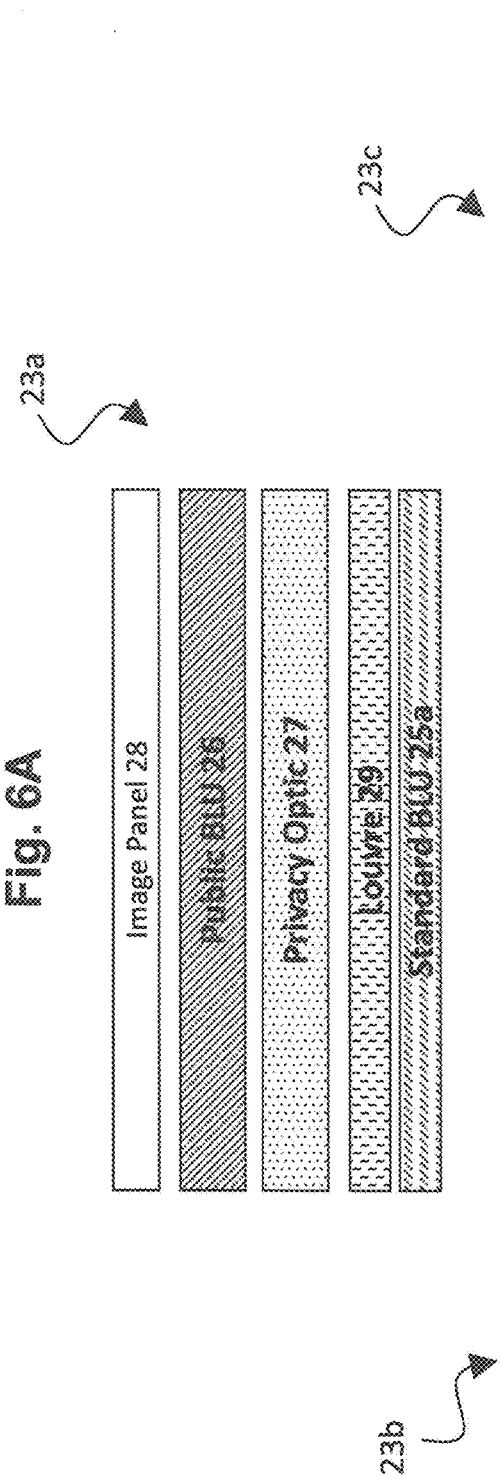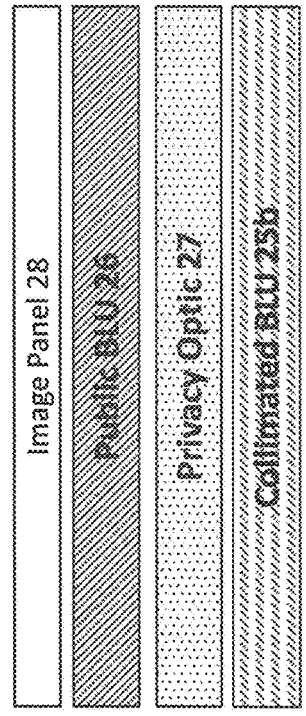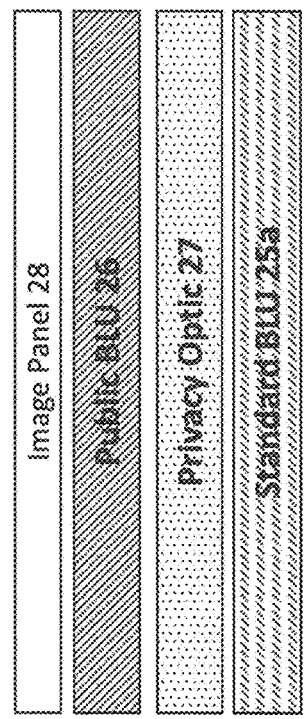

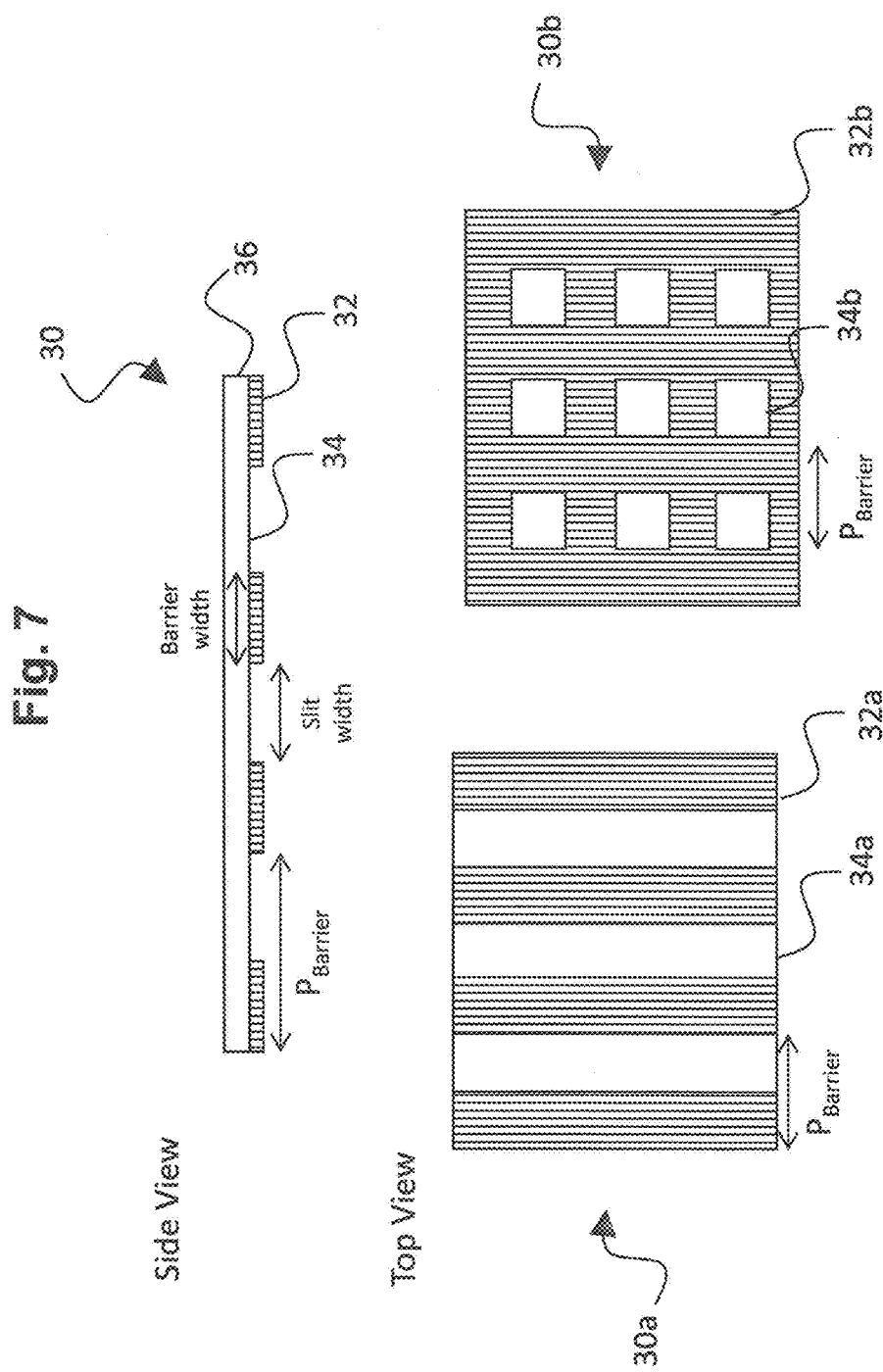

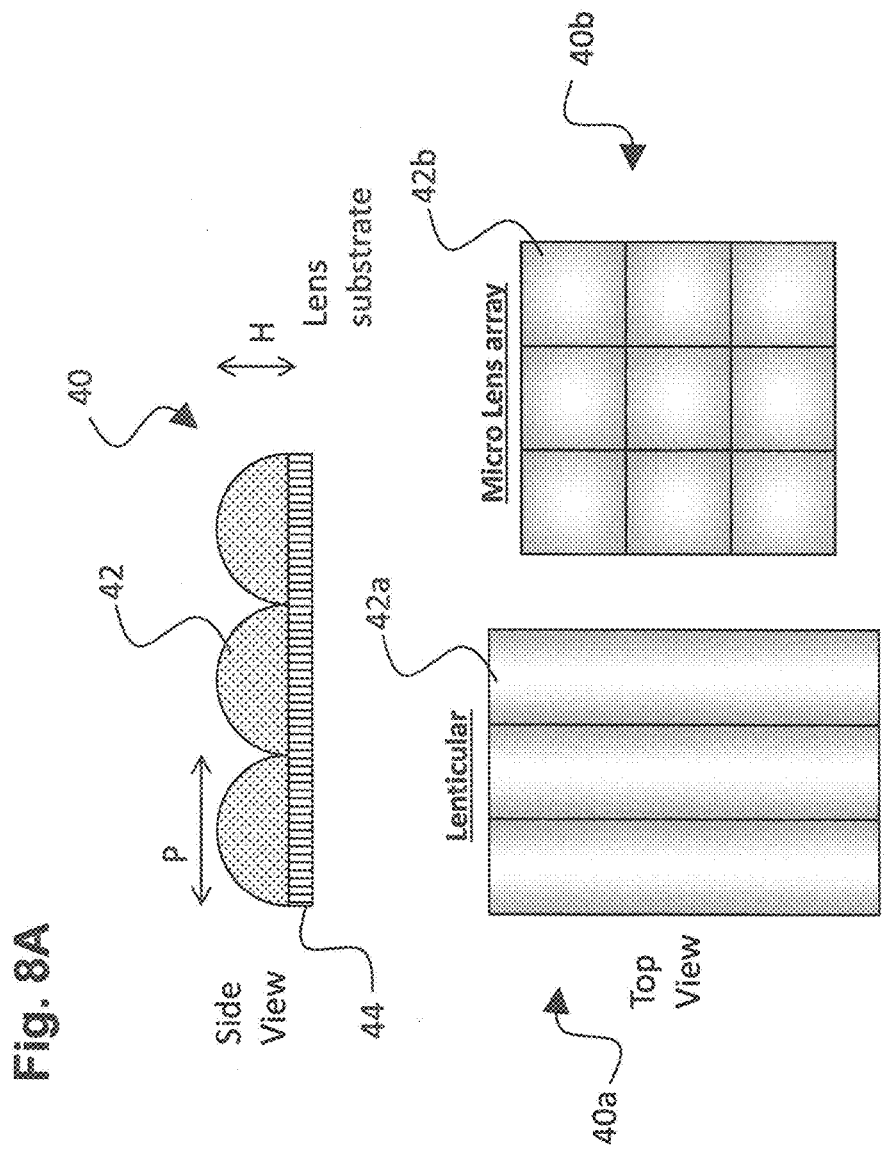

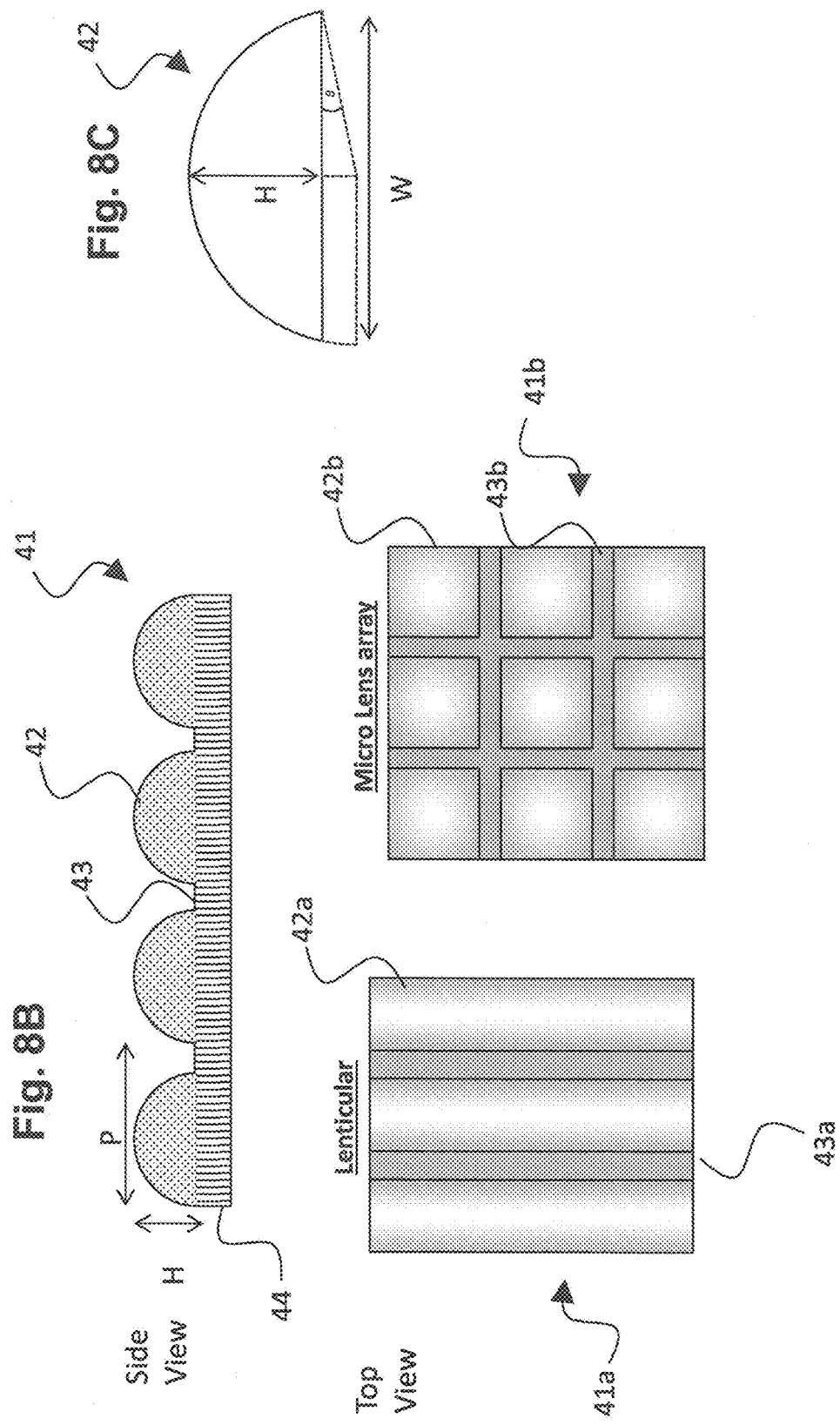

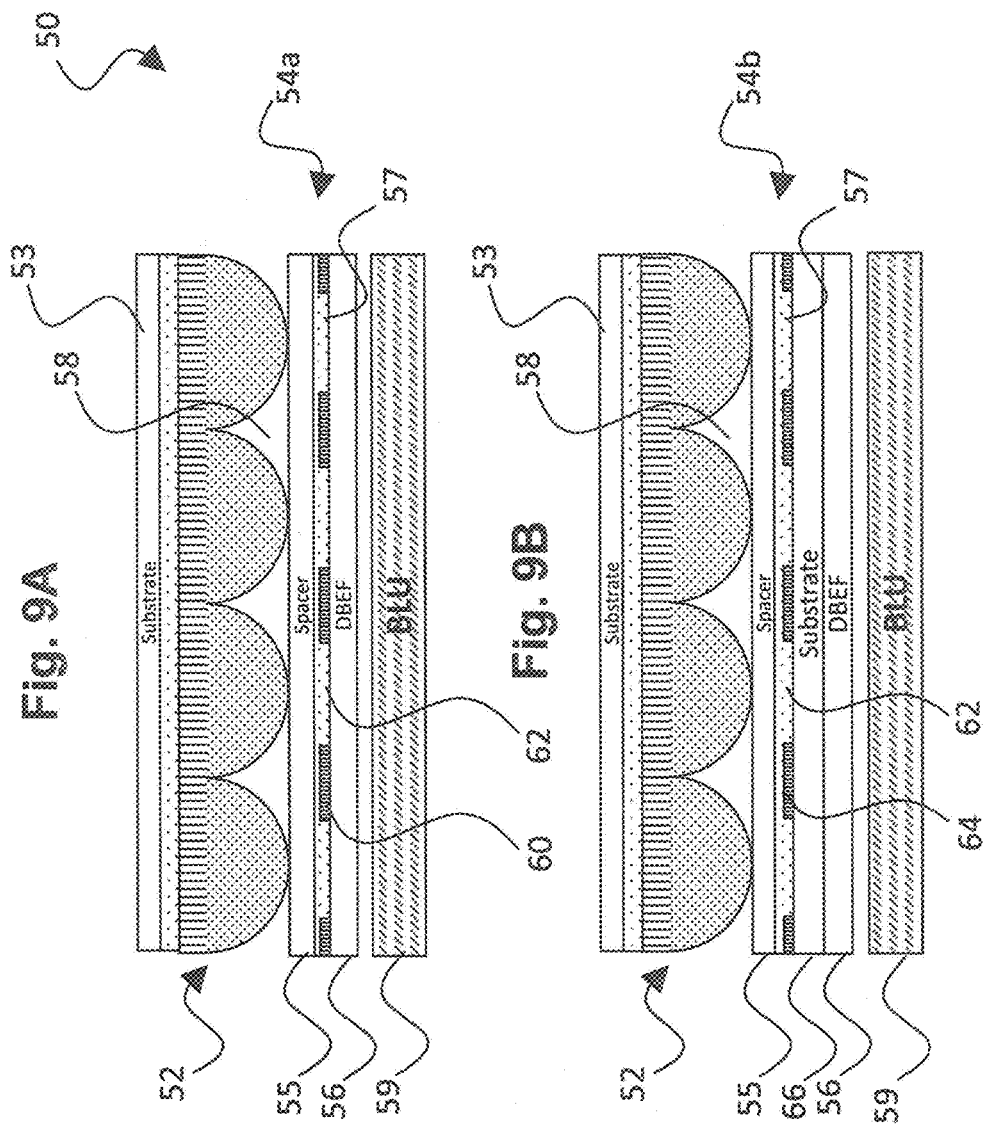

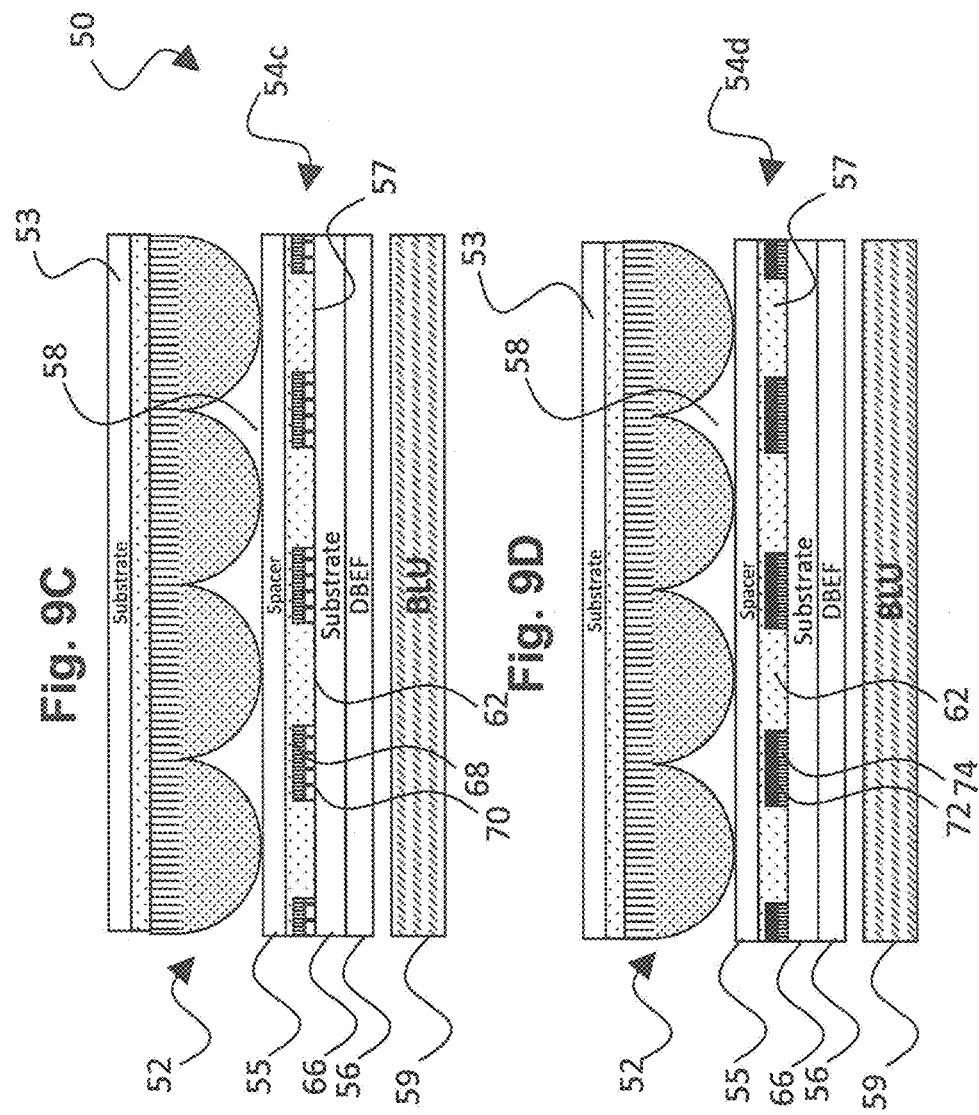

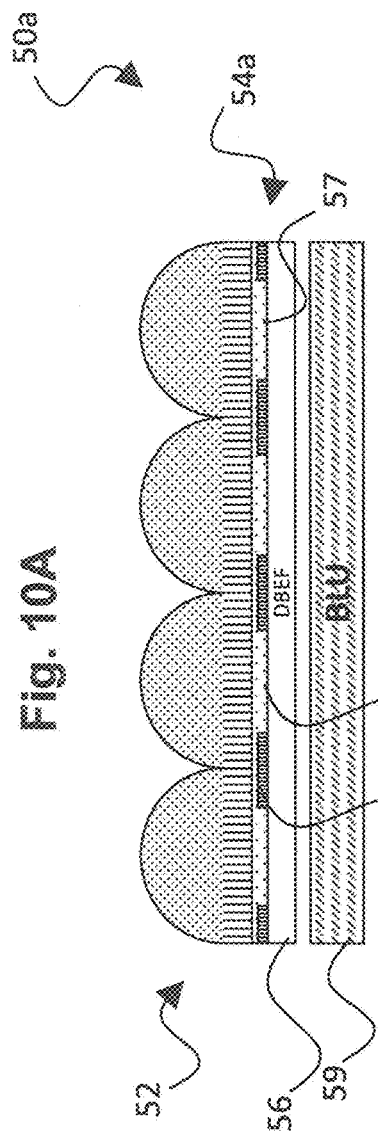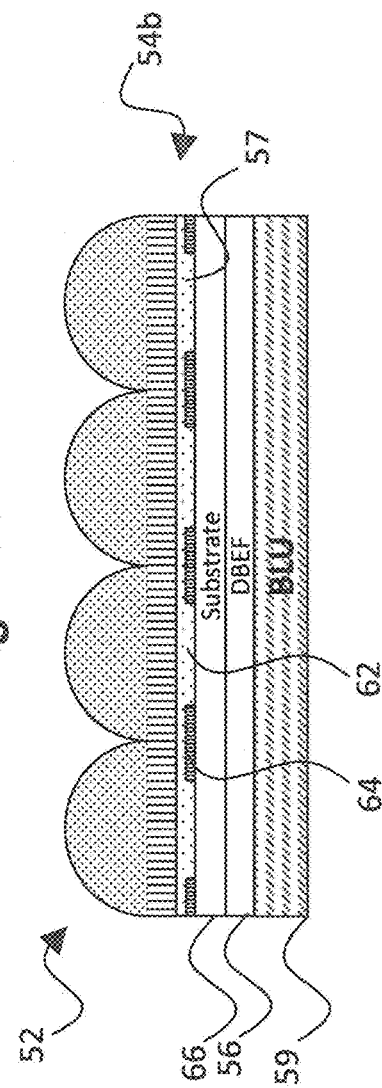

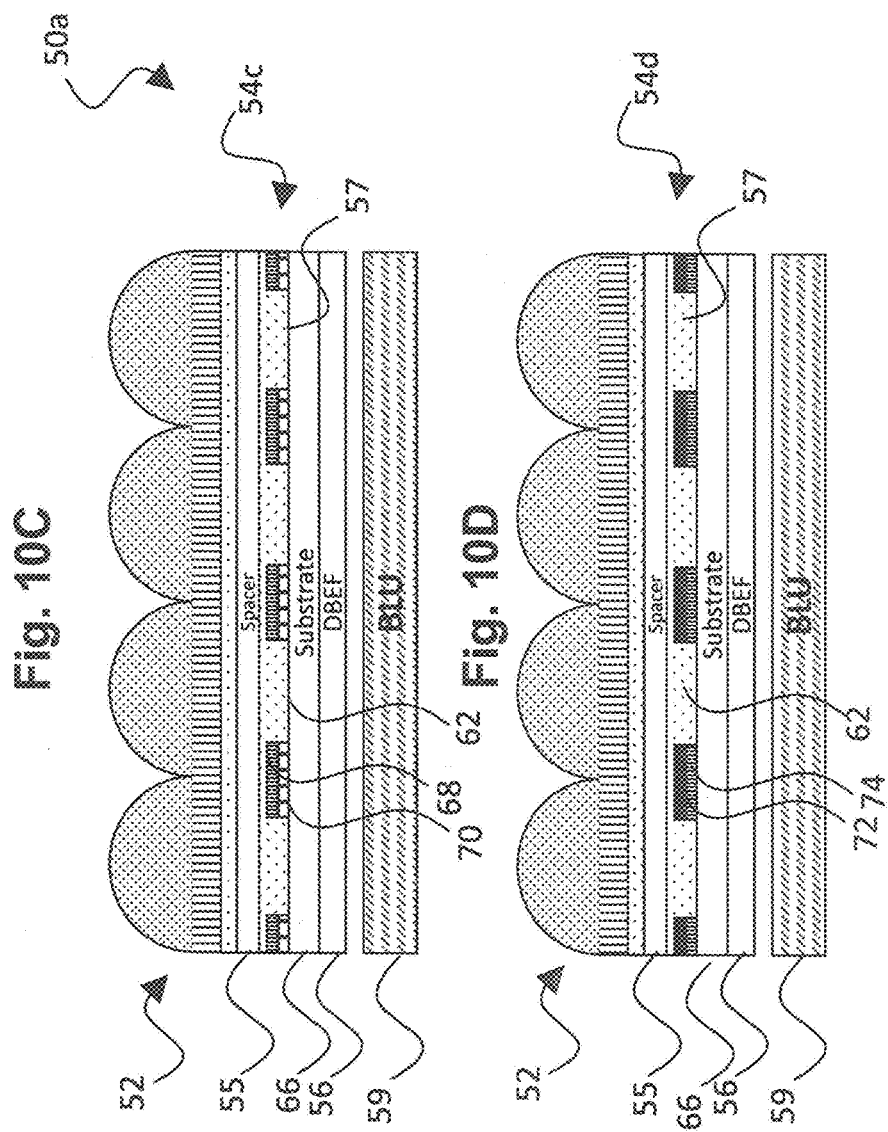

Measured data of black barrier vs reflective barrier

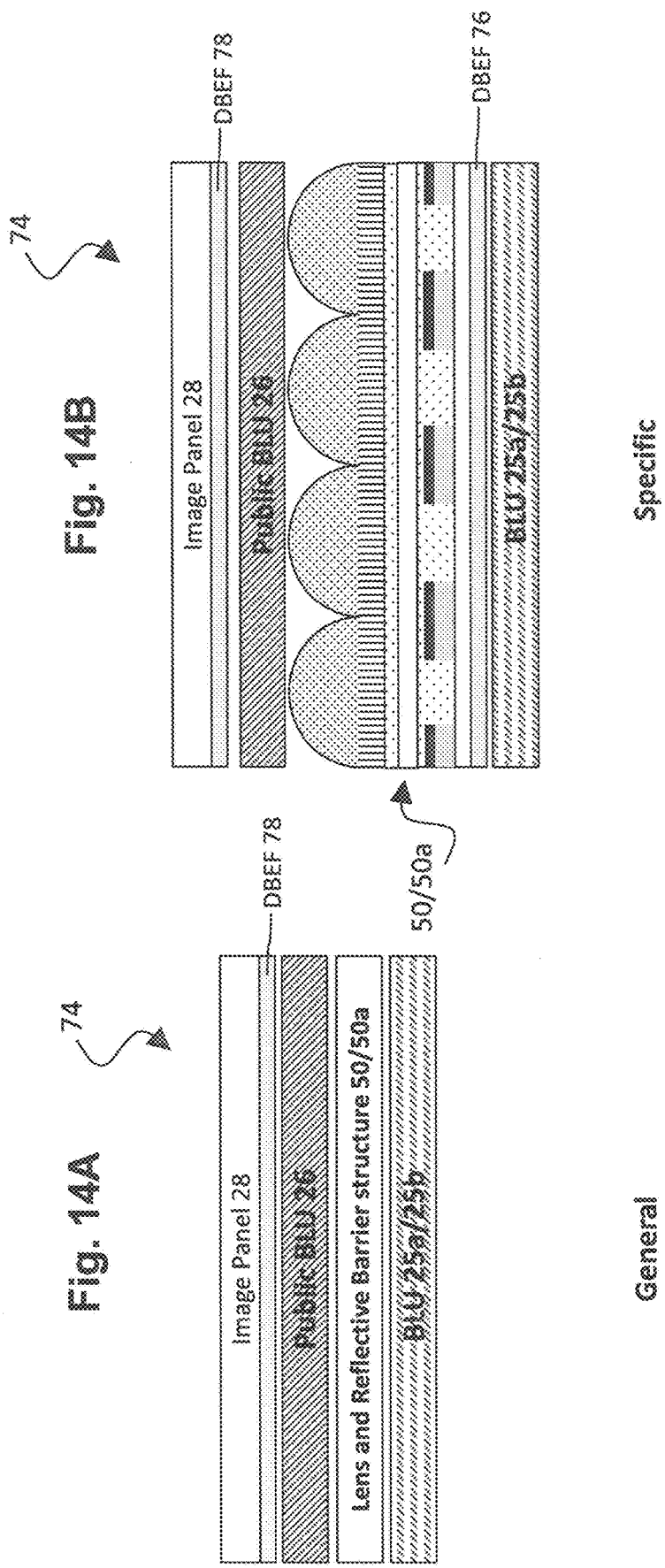

| Mode | Public BLU | Privacy BLU | HAN Cell |
|---|---|---|---|
| Public | On | Off | Off |
| Bright Public | On | On | Off |
| Private | Off | On | Off |
| Extra Private | Off | On | On |

Fig. 16

Specific

General

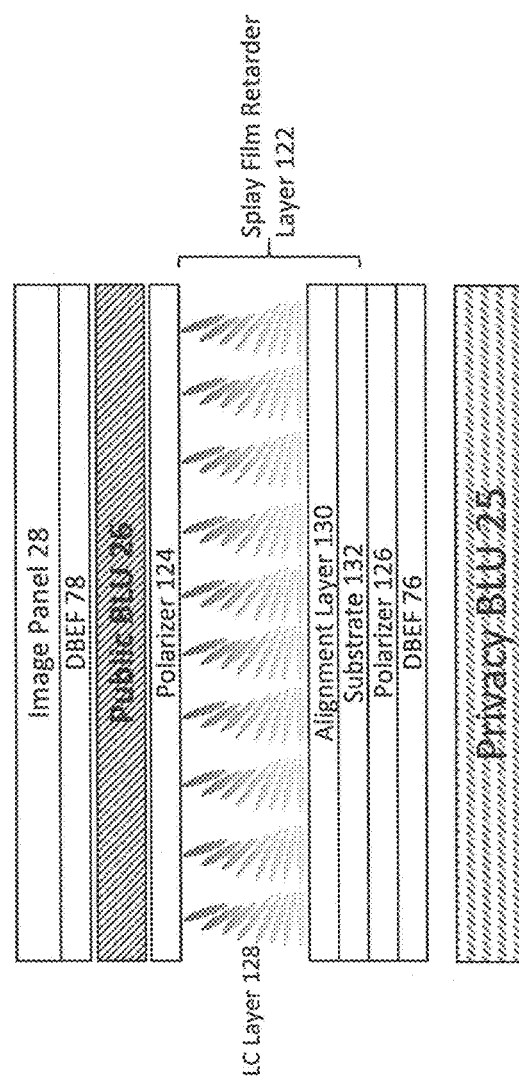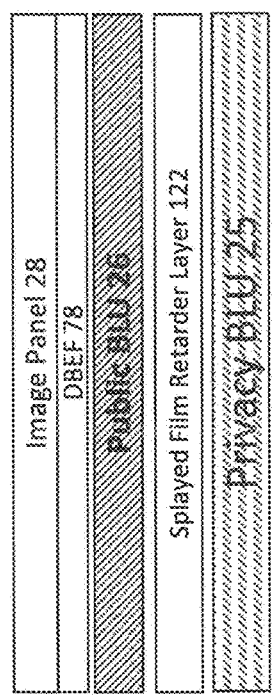

ENHANCED PRIVACY SWITCHABLE BACKLIGHT SYSTEM

TECHNICAL FIELD

The present invention relates to a switchable privacy display system for use, for example, as an automotive display involving a backlight system that is switchable between a strong privacy mode and a bright public mode.

BACKGROUND ART

Displays in automotive vehicles are becoming more and more prominent. There is a push for larger displays to become a common feature in cars including entertainment displays for the passenger. The main obstacle preventing this from becoming a reality is privacy: by law in many jurisdictions and otherwise for general safety concerns, a driver must not be able to view moving image content on a display while driving. Accordingly, if a passenger is watching video content on the dashboard display, no light (or no variation of light level) is to be visible from the driver's position. Such result necessitates a strong privacy display, by which image content is visible only from within a specific and limited viewing angle range, and otherwise generally is not visible to a viewer outside of such viewing angle range.

Accordingly, attempts have been made to provide display systems with a strong privacy mode. FIG. 1A is a schematic drawing depicting a liquid crystal device (LCD) configuration 10 as is conventional in the art. FIG. 1B is a schematic drawing depicting an LCD configuration 20 that is representative of an improved privacy display designed by Applicant, as described in Applicant's application Ser. No. 15/981,022 filed on May 16, 2018 (the '022 Application), the contents of which are incorporated herein by reference. In the conventional configuration 10, a backlight 12 emits light 14 to a view angle control film 16, and the light subsequently illuminates a liquid crystal display (LCD) image panel 18. The view angle control film may be a Louvre film as are known in the art. As illustrated by the arrows schematically illustrating the light beams 14, although there is some attenuation of off-axis light by the view angle control film 16, the screening of the off-axis light often is insufficient to provide a full private mode, as some residual off-axis light is still transmitted to the image panel 18 and thus to the viewing side (as indicated by the smaller arrows pointing in the off-axis direction). Accordingly, a strong private mode is not achieved as an image corresponding to the residual off-axis light still may be perceived by an off-axis viewer. Accordingly, the conventional configuration of FIG. 1A results in a privacy mode that in particular does not meet the stringent requirements for automotive applications.

In the LCD device 20 of FIG. 1B that is described in the '022 Application, an additional switchable view angle control LCD 22 is incorporated into the device. The switchable view angle control LCD 22 may be a switchable scattering LCD that can be electrically switched between a first mode (Mode 1 in FIG. 1B) and a second mode (Mode 2 in FIG. 1B). In the first mode (Mode 1), the switchable view angle control LCD 22 performs a view angle restriction function without scattering light to provide a narrow angle viewing or private mode. Comparing Mode 1 to the conventional configuration, the off-axis light that might not be screened out by the view angle control film 16 is now blocked by the switchable view angle control LCD 22. In this manner, an enhanced privacy mode is achieved as compared to conventional configurations. In the second mode (Mode 2), the switchable view angle control LCD 22 operates to perform a light scattering function to achieve a wide angle viewing or public mode.

Accordingly, the configuration of the '022 Application of FIG. 1B addresses the automotive industry need for a display system that can switch between a strong private mode and a public mode. As described in the '022 Application, one way of achieving switchable privacy is to have a switchable scatterer positioned above a privacy optic such as the above-mentioned Louvre film. For example, the '022 Application describes a Hydrodynamic hybrid-aligned nematic (HHAN) cell that, in a first mode, enhances the privacy of the display device, and in a second mode, scatters the previously collimated light off-axis to provide the public mode. One drawback of this system, however, is that the light efficiency is low and the public mode can appear dim because a Louvre film generally has a low light efficiency, transmitting only about 35% of the light from a backlight. When the HHAN cell is placed in the scattering mode, the already low level of collimated light is scattered out to wider angles, which can result in a dim public mode.

An alternative method of achieving a switchable privacy display system is to use a switchable backlight system with dual backlight units, such as taught by U.S. Pat. No. 9,881,531 (Klippstein et al., issued Jan. 30, 2018). FIG. 2 is a drawing depicting such a conventional display system 10a using a switchable dual backlight system, and illustrating such a system operating in both a private mode and a public mode. Such system includes the image panel 18 on a viewing side of a first privacy backlight unit 12a having a narrow viewing angle range, and a second public backlight unit 12b having a wide viewing angle range. The privacy backlight unit 12a is positioned on the non-viewing side of the public backlight unit 12b. In the private mode, the privacy backlight unit 12a is turned on and the public backlight unit 12b is turned off, and the system operates comparably as in FIG. 1A. In the public mode, the public backlight unit 12b is turned on and the privacy backlight unit 12a is turned off for a brighter wide angle viewing mode. Comparably as with other conventional configurations, the switchable dual backlight system 10a of FIG. 2 does not have a sufficiently strong privacy mode to be used in automotive applications.

FIGS. 3 and 4 are schematic drawings depicting alternative LCD configurations 20a and 20b based on embodiments described in the '022 Application. In such examples, an additional privacy LCD 22a that may be a HAN cell (FIG. 3), or that may be a switchable scattering privacy LCD 22b such as an HHAN cell (FIG. 4), is combined with the dual backlight unit configuration, with the switchable privacy LCD being positioned on the viewing side of the public backlight unit. The switchable scattering privacy LCD 22b may be a HHAN cell as referenced above. One downside to the switchable dual backlight system with an additional privacy optic solution such as the privacy LCD 22a/22b is that the privacy optic also acts on the light emitted from the public mode backlight unit 12b, which reduces the brightness and performance of the public mode.

SUMMARY OF INVENTION

There is a need in the art, therefore, for an enhanced switchable privacy display system by which a strong private mode is achieved, and additionally enhanced light efficiency is transmitted by the privacy optic so that in both the private mode and the public mode, the display system does not appear too dim. The present invention pertains to such an enhanced switchable privacy display system. Such a display system is suitable for automotive displays in which such a strong private mode is required, although principles of the present invention may be applied to any suitable switchable privacy display system. To provide such an enhanced switchable privacy display system, the present invention employs a switchable dual backlight unit system in combination with an additional privacy optic that is positioned on the non-viewing side of the public mode backlight unit and between the private mode backlight unit and the public mode backlight unit.

A switchable privacy display system has an enhanced dual backlight system that includes a first or privacy backlight unit, a second or public backlight unit, and a privacy optic component situated in between the first and second backlight units, i.e., on a viewing side of the privacy backlight unit and on a non-viewing side of the public backlight unit. Light emitted from the first backlight unit may pass through the second backlight unit. For a display system with a strong privacy mode, the first backlight unit may have a narrower viewing angle range as compared to the second backlight unit. The backlight system may be operated in at least three different modes. In a first or private mode, the first (privacy) backlight unit is on, and the second (public) backlight unit is off. In the private mode, the privacy backlight unit emits light that is predominantly in a narrow viewing angle range, and the off-axis light further is attenuated and substantially eliminated by the privacy optic, so as to provide a strong private mode. In a second or public mode, the first (privacy) backlight unit is off, and the second (public) backlight unit is on. In the public mode, the privacy backlight unit may not emit light, and the public backlight unit emits light to illuminate the image panel in a wide viewing angle range for a strong public mode. In exemplar embodiments, both backlight units may be on to achieve a public mode of any desired or enhanced brightness.

The privacy optic component may be passive or active (i.e., electrically switchable). In exemplary embodiments, enhanced light efficiency is achieved using a backlight system in which the privacy optic is configured as a reflective barrier and slit structure in combination with a lens array. In other exemplary embodiments, the privacy optic may be configured as a switchable liquid crystal (LC) retarder cell, such as for example a hybrid-aligned nematic (HAN) cell or a splayed film LC retarder cell. The LC retarder cell is switchable between a first mode that enhances the privacy of the display device by further collimating light that is transmitted through the LC retarder cell, and in a second mode that does not collimate light that is transmitted through the LC retarder cell. For example, the HAN cell may be configured as either a HAN cell including a negative dielectric anisotropy LC material that is switchable between a wide viewing angle mode and a narrow viewing angle mode, or a HAN cell including a positive dielectric anisotropy LC material that is switchable between a narrow viewing angle mode and an even narrower viewing angle mode, although a positive dielectric anisotropy LC material is preferred.

An aspect of the invention, therefore, is a backlight system for controlling a viewing angle in a switchable privacy display system that achieves a strong private mode and enhanced brightness in the private and public modes as compared to conventional configurations. Another aspect of the invention is a switchable privacy display system that is operable in a narrow viewing angle private mode and a wide viewing angle public mode, wherein the display system includes the backlight system according to any of the embodiments in combination with an image panel.

In exemplary embodiments, the backlight system includes a first backlight unit that emits light from a non-viewing side of the backlight system toward a viewing side of the backlight system; a second backlight unit located on a viewing side of the first backlight unit that emits light toward the viewing side of the backlight system; and a privacy optic that includes a liquid crystal material and is located on a non-viewing side of the second backlight unit and between the first backlight unit and the second backlight unit, wherein the privacy optic operates to transmit light from the first backlight unit in a limited viewing angle range. In exemplary embodiments, the privacy optic includes a reflective barrier and lens array system, a switchable liquid crystal retarder cell such as a hybrid aligned nematic (HAN) cell or a splayed film LC retarder cell, or a switchable liquid crystal retarder cell in combination with a reflective barrier and lens array system located on a non-viewing side of the switchable liquid crystal retarder cell.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIGS. 6A, 6B, and 6C are drawings depicting variations on the display system of FIG. 5, illustrating alternative configurations of the privacy backlight unit.

FIG. 7 is a schematic drawing depicting an exemplary barrier and slit structure including a side view and a top view.

FIG. 8A is schematic drawing depicting an exemplary lens array including a side view and a top view.

FIG. 8B is schematic drawing depicting another exemplary lens array including a side view and a top view.

FIG. 8C is a schematic drawing depicting a cross-sectional view showing cross-sectional dimensions of a lens element that may be included in the lens arrays of FIGS. 8A and 8B.

FIGS. 9A, 9B, 9C, and 9D are schematic drawings depicting various configurations of a backlight system including an optical stack that combines a reflective barrier and slit structure with a lens array in accordance with embodiments of the present invention.

FIGS. 10A, 10B, 10C, and 10D are schematic drawings depicting alternative configurations of a backlight system including an optical stack that combines a reflective barrier and slit structure with a lens array in accordance with embodiments of the present invention.

FIGS. 14A and 14B are schematic drawings depicting an exemplary display system in accordance with embodiments of the present invention, in which the privacy optic is configured as a reflective barrier and lens array system.

FIG. 16 is a chart depicting modes of operation of the backlight system with the HAN cell that is employed in the display system of FIG. 15B.

FIGS. 18A and 18B are schematic drawings depicting an exemplary display system in accordance with embodiments of the present invention, in which the privacy optic is configured as a splayed film LC retarder cell.

DESCRIPTION OF EMBODIMENTS

Figure 1:
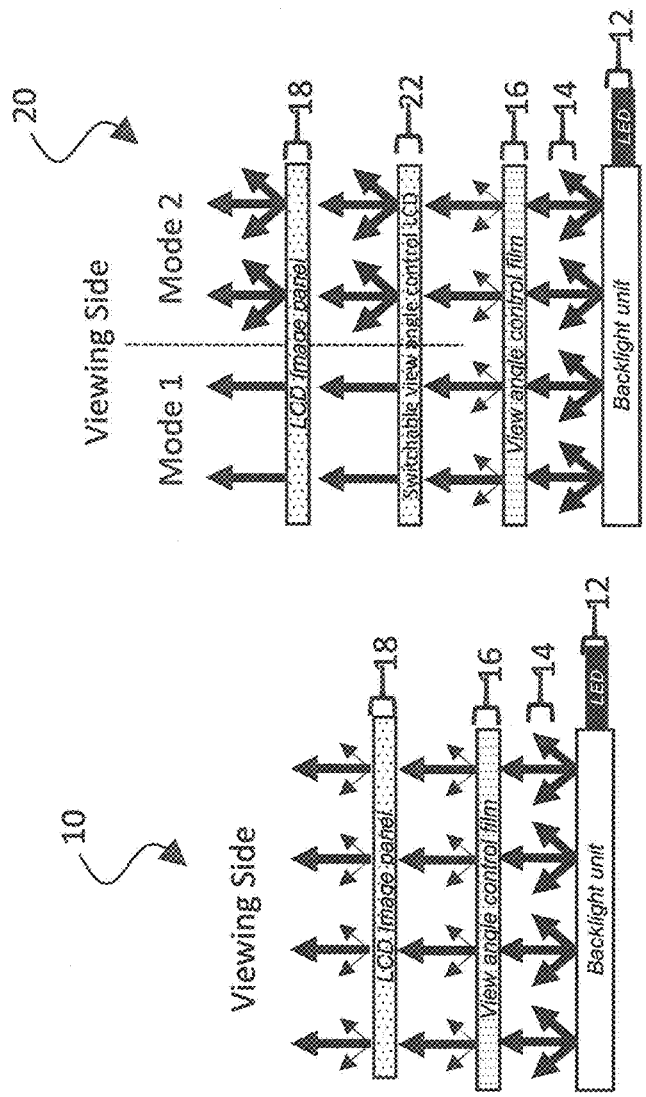
FIG. 1A is a schematic drawing depicting a liquid crystal device (LCD) configuration as is conventional in the art.
FIG. 1B is a schematic drawing depicting an LCD configuration that is representative of an improved privacy display previously designed by Applicant.
Figure 2:
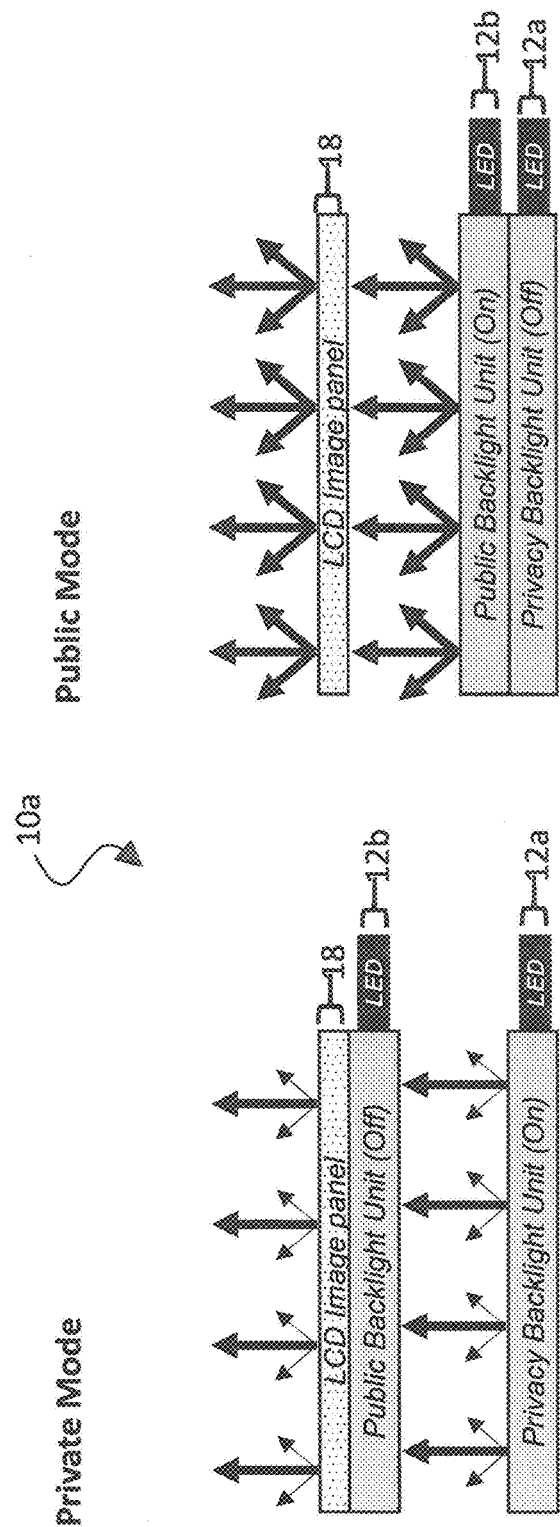
FIG. 2 is a schematic drawing depicting a liquid crystal device (LCD) configuration as is conventional in the art, which uses a switchable backlight system having a private backlight unit and a public backlight unit, and illustrating operation in a private mode and a public mode.
Figure 3:
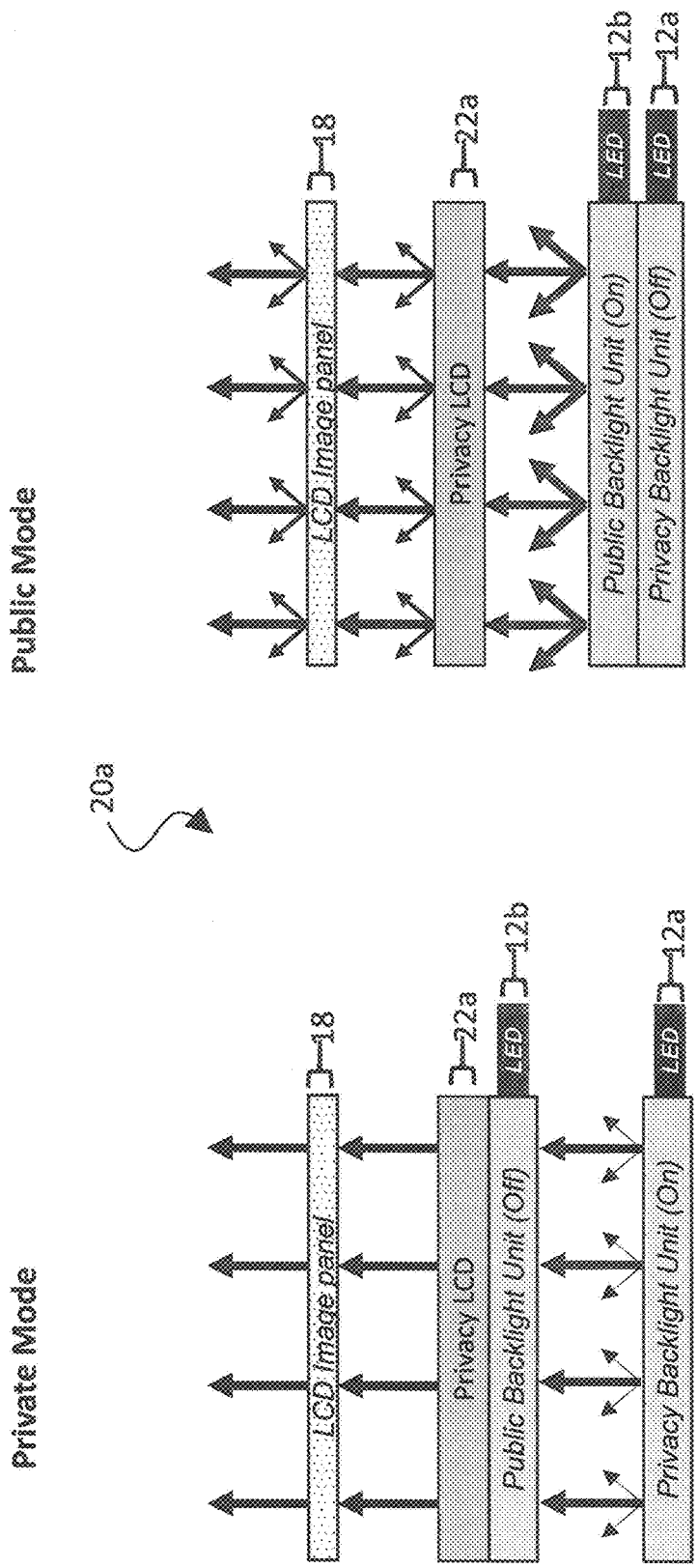
FIG. 3 is a schematic drawing depicting an LCD configuration that is representative of an improved privacy display previously designed by Applicant, which uses a switchable backlight system in combination with a privacy LCD located on a viewing side of the public backlight unit, and illustrating operation in a private mode and a public mode.
Figure 4:
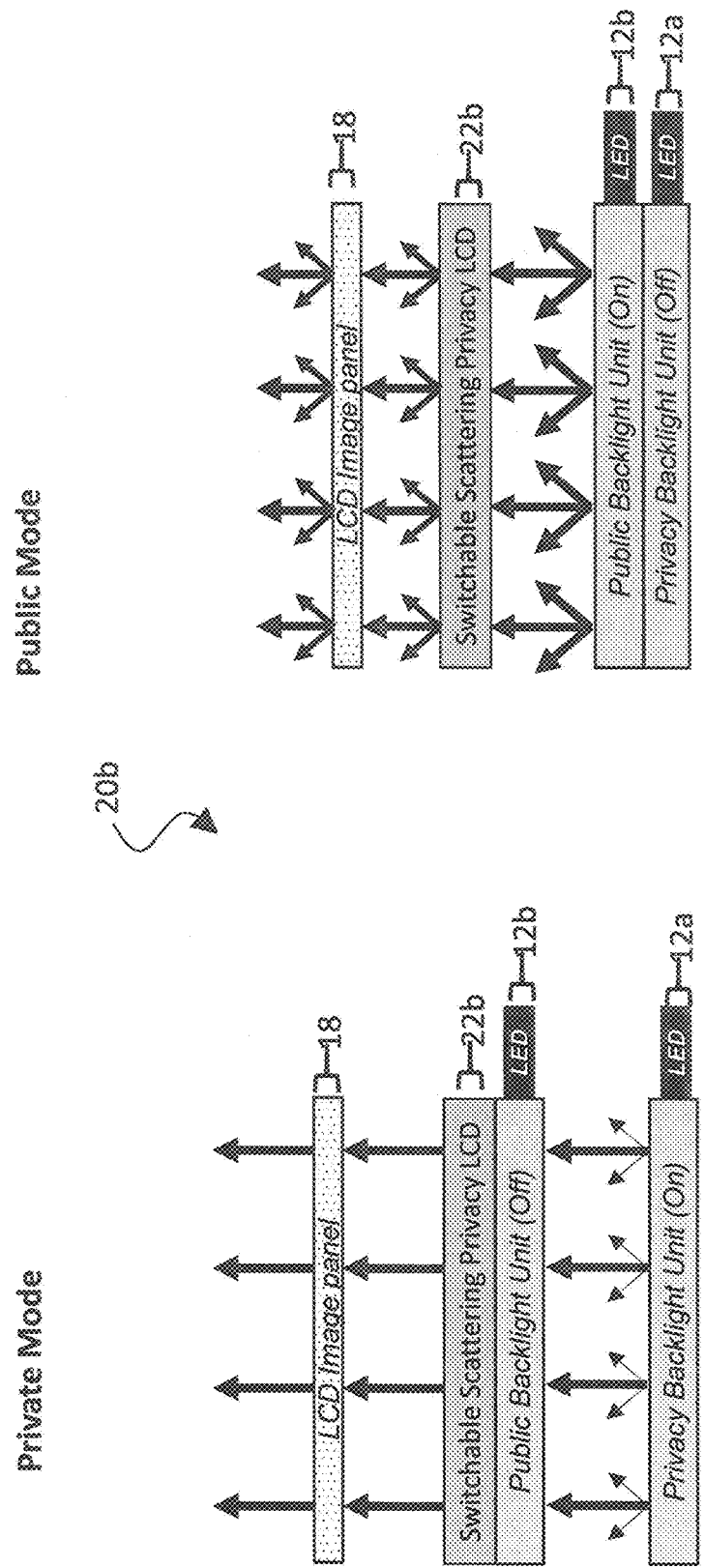
FIG. 4 is a schematic drawing depicting the LCD configuration of FIG. 3, in which the privacy LCD is configured as a switchable scattering privacy LCD.

Embodiments of the present invention will now be described with reference to the drawings, wherein like reference numerals are used to refer to like elements throughout. It will be understood that the figures are not necessarily to scale.

Switchable Privacy Backlight and Display System Overview

The present invention pertains to an enhanced switchable privacy display system by which a strong private mode is achieved, and additionally enhanced light efficiency is transmitted by the privacy optic so that in both the private mode and the public mode, the display system does not appear too dim. Such a display system is suitable for automotive displays in which such a strong private mode is required, although principles of the present invention may be applied to any suitable switchable privacy display system. To provide such an enhanced switchable privacy display system, the present invention employs a switchable dual backlight unit system in combination with an additional privacy optic that is positioned on the non-viewing side of the public mode backlight unit and between the private mode backlight unit and the public mode backlight unit.

An aspect of the invention, therefore, is a backlight system for controlling a viewing angle in a switchable privacy display system that achieves a strong private mode and enhanced brightness in the private and public modes as compared to conventional configurations. Another aspect of the invention is a switchable privacy display system that is operable in a narrow viewing angle private mode and a wide viewing angle public mode, wherein the display system includes the backlight system according to any of the embodiments in combination with an image panel. In exemplary embodiments, the backlight system includes a first backlight unit that emits light from a non-viewing side of the backlight system toward a viewing side of the backlight system; a second backlight unit located on a viewing side of the first backlight unit that emits light toward the viewing side of the backlight system; and a privacy optic that includes a liquid crystal material and is located on a non-viewing side of the second backlight unit and between the first backlight unit and the second backlight unit, wherein the privacy optic operates to transmit light from the first backlight unit in a limited viewing angle range.

Figure 5:
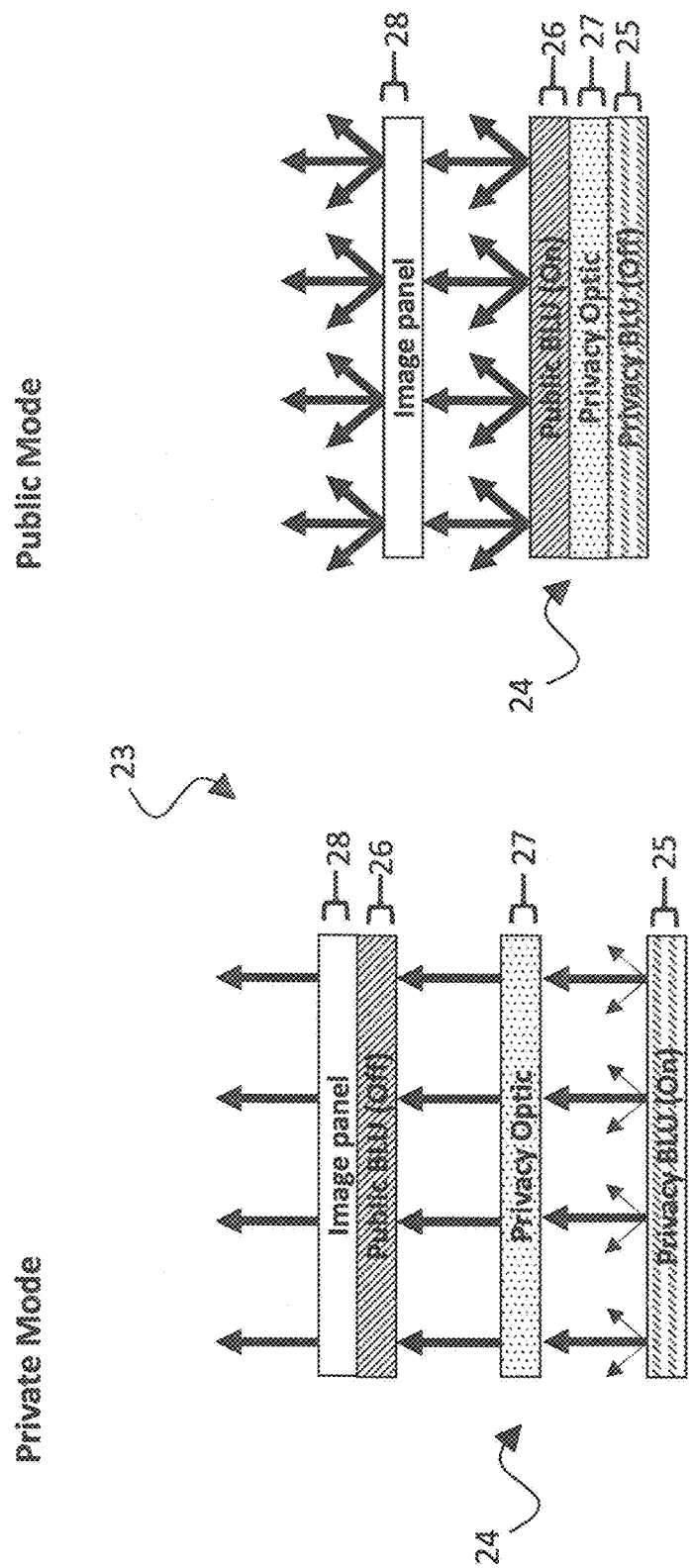
FIG. 5 is a schematic drawing depicting a display system in accordance with embodiments of the present invention, and illustrating operation in a private mode and a public mode.

FIG. 5 is a schematic drawing depicting a backlight system 24 for use in a switchable privacy display system 23, in accordance with embodiments of the present invention and illustrating operation in a private mode and a public mode. The backlight system 24 includes a first or privacy backlight unit 25, a second or public backlight unit 26 located on the viewing side of the privacy backlight unit 25, and a privacy optic component 27 situated in between the first and second backlight units, i.e., on a viewing side of the privacy backlight unit 25 and on a non-viewing side of the public backlight unit 26. Light emitted from the first backlight unit 25 may pass through the second backlight unit 26. For a display system with a strong privacy mode, the first backlight unit 25 may have a narrower viewing angle range as compared to the second backlight unit 26. For such a narrow viewing angle range, the first backlight unit 25 may be realized by several methods that are known in the art, including for example by using a turning lens film, a Louver film with a standard backlight, or by using a crossed brightness enhancement film (XBEF) backlight, as further detailed below. The second backlight unit 26 may have a relatively wider viewing range as compared to the first backlight unit 25 to enable a strong public mode. It further is desirable that the extraction features on the second backlight unit not cause significant scattering of collimated light transmitted from the first backlight unit 25 and the privacy optic 27. An image panel 28 is positioned on a viewing side of the backlight system 24.

The backlight system 24 may be operated in at least three different modes. In a first or private mode as illustrated in the left portion of FIG. 5, the first (privacy) backlight unit 25 is on, and the second (public) backlight unit 26 is off. In the private mode, the privacy backlight unit 25 emits light that is predominantly in a narrow viewing angle range (e.g., on-axis perpendicular to the backlight system), although a portion of residual light is emitted off-axis. The off-axis light further is attenuated and substantially eliminated by the privacy optic 27, so as to provide a strong private mode in which the light is transmitted substantially collimated only in the narrow viewing angle (e.g., on-axis) range. The collimated light transmitted from the privacy optic 27 passes through the second backlight unit 27, which does not emit light in the private mode, to illuminate the image panel 28.

In a second or public mode as illustrated in the right portion of FIG. 5, the first (privacy) backlight unit 25 is off, and the second (public) backlight unit 26 is on. In the public mode, the privacy backlight unit 25 does not emit light, and the public backlight unit 26 emits light to illuminate the image panel 28 in a wide viewing angle range for a strong public mode. In a variation of the public mode (not shown in FIG. 5) both backlight units 25 and 26 may be on with both having a power between 0-100% to achieve a public mode of any desired or enhanced brightness.

FIGS. 6A-6C are drawings depicting variations on the display system of FIG. 5, illustrating alternative configurations of the privacy backlight unit. In the display system 23a of FIG. 6A, the privacy backlight unit includes a "standard" backlight unit 25a, i.e., a backlight unit that natively does not emit light within any restricted viewing angle range, in combination with a Louvre film 29 that can restrict light emitted from the standard backlight unit 25a to a narrower viewing angle range, as shown illustrated for example in the left portion of FIG. 5. In a variation of this embodiment as shown in the display system 23b of FIG. 6B, the standard backlight unit 25a may be used by itself, with the viewing angle restriction only being implemented by the privacy optic 27. In the display system 23c of FIG. 6C, a strong privacy backlight unit 25b incorporates light collimating features internally within the backlight structure to provide the reduced viewing angle range. The collimated or narrow viewing angle backlight unit 25b, for example, may be a turning lens backlight unit or an XBEF backlight unit as are known in the art. The collimating backlight unit also may be used in combination with an additional Louvre film 29 similarly as the standard backlight unit 25a of FIG. 6A. In these various embodiments, the public backlight unit 26 may be a backlight unit that emits light without any particular viewing angle restriction.

As further detailed below, the privacy optic component 27 may be passive or active (i.e., electrically switchable). As further detailed below, in exemplary embodiments the privacy optic includes a reflective barrier and lens array system, a switchable liquid crystal retarder cell such as a positive LC hybrid aligned nematic (HAN) cell or a splayed film LC retarder cell, or a switchable liquid crystal retarder cell in combination with a reflective barrier and lens array system located on a non-viewing side of the liquid crystal retarder cell. The LC retarder cell is switchable between a first mode that enhances the privacy of the display device by further collimating light that is transmitted through the LC retarder cell within a narrow viewing angle range, and in a second mode that transmits light at a wider viewing angle as compared to the first mode. The positive LC HAN cell can be switched between a weak privacy enhancement and a strong privacy enhancement.

Display System Using Reflective Barrier Structure and Lens Array System as Privacy Optic One method for achieving good privacy performance is to use a slit and barrier structure and a lens array. FIG. 7 is a schematic drawing depicting an exemplary barrier and slit structure 30 including a side view and a top view. As seen in the side view, the barrier and slit structure 30 may include opaque barrier regions 32 interspersed with transparent slit regions 34, with the opaque barrier regions being formed on a substrate 36 that is a transparent material such as glass to form the slits. A pitch $P_{barrier}$ of the barrier and slit structure 30 is defined as the combined slit width and barrier width. A slit may have a width comparable to or the same as the width of an adjacent barrier, or the slit width may be less than or greater than the barrier width. It may be beneficial for the slit:barrier width ratio to be in the range of 20:80≤slit:barrier≤70:30, preferably in the range of 30:70≤slit:barrier≤60:40 or in the range of 40:60≤slit:barrier≤50:50. As seen in the top view portion of FIG. 7, in a barrier and slit configuration 30a the barriers can be arranged in parallel barrier strips 32a with parallel slits 34a interspersed between the barriers (1D version). Alternatively, in a barrier and slit configuration 30b the barriers can be arranged as a barrier grid 32b with apertures 34b interspersed within the grid acting as the slits (2D version). The apertures may be any shape such as square, rectangular, circular or elliptical. The barrier and slit pitch may vary across the structure, or the pitch may be consistent across the structure. The barrier and slit structure may be a film whereby the slits have been cut out, or the structure may have been patterned onto a substrate, with variations described in more detail below.

FIGS. 8A and 8B are schematic drawings depicting exemplary lens arrays 40 and 41 each including a side view and a top view. The lens arrays 40/41 include an array of lens elements 42 deposited on a transparent substrate 44. In the configuration of lens array 40, the lens elements 42 are positioned adjacent to each other with essentially no gaps between the lens elements. In the configuration of lens array 41, the lens elements 42 are positioned with gaps 43 present between adjacent lens elements.

As seen in the top views, the lens arrays 40 and 41 may be configured as a lenticular lens array 40a or 41a (1D version) configured as strips of lens elements 42a formed as near half-cylinder lens elements, which in the configuration of lens array 41a further includes gaps 43a oriented as parallel strips between the lens elements 42a. Alternatively, the lens arrays 40 and 41 may be configured as a micro-lens array 40b or 41b (2D version) configured as a two-dimensional array of near half sphere lens elements 42b, which in the configuration of lens array 41b further includes gaps 43b oriented as a grid of gaps running between the lens elements 42b.

FIG. 8C is a schematic drawing depicting a cross-sectional view showing cross-sectional dimensions of a lens element 42 that may be included in the lens arrays of FIGS. 8A and 8B. Referring to such figures, the lens elements have a pitch P, a height H, a width W, and may have an angle from semicircle/sphere θ as a deviation parameter. In the embodiments including the gaps 43, the pitch is the sum of the lens width and the gap width. The pitch may be uniform across the lens array or may vary across the array. For a lens and barrier system, it may be desirable that the lens elements have a strong focusing power. The closer the lens elements are to exact half-cylinders or half-spheres, the stronger the lens elements will be. For a lens and barrier system for use in a privacy display, it is desirable that the ratio of $$\frac{\text{Pitch}}{\text{Height}}(P/H)$$

of the lenses is in the range 5≥P/H≥2. More preferably, the ratio P/H is in the range 3≥P/H≥2, or in the range 2.5≥P/H≥2. Current lenticular fabrication techniques are unable to fabricate exact semicircle or spherical lenses, but are able to create an array with lens elements that have a deviation parameter of θ≥3°. Lens elements can be made stronger by using a high refractive index material. The lens materials may have a refractive index of n>1.45, and preferably n>1.50 or n>1.55. It may be desirable that the lens elements are made out of a low to negligible birefringence resin. The lens elements may be fabricated on a substrate that also has low to negligible birefringence. A high birefringence material substrate could be used in some applications, but this may cause unwanted optical effects unless additional polarizer optics are carefully aligned to counteract such effects.

Figure 8D:
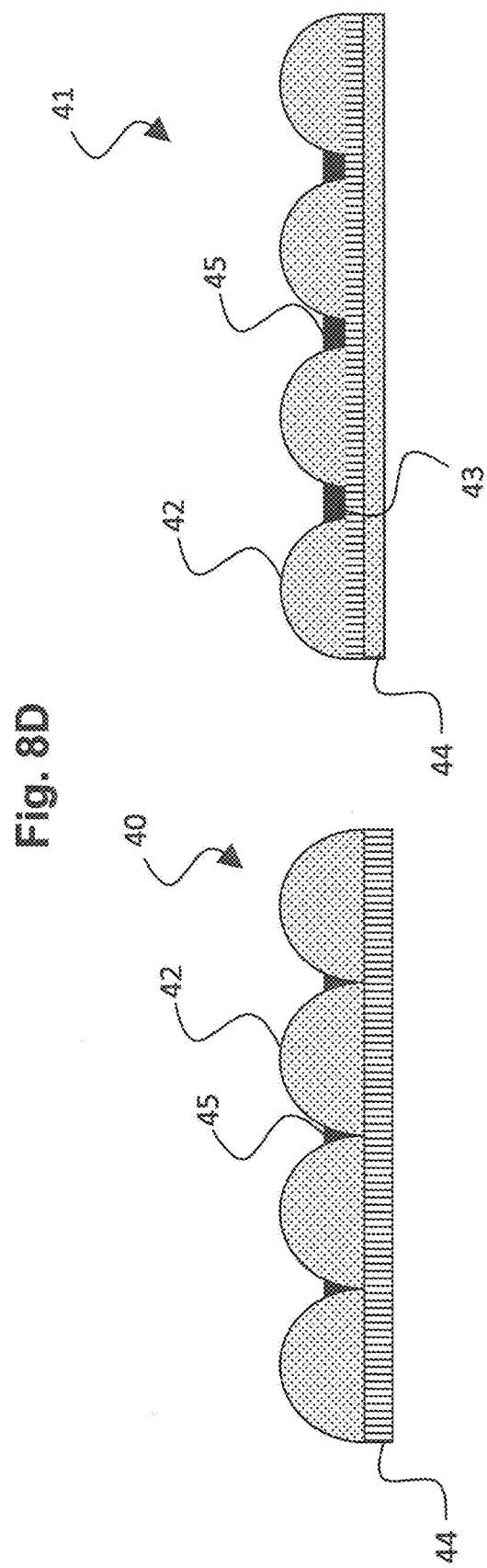
FIG. 8D is a schematic drawing depicting a variation on the lens arrays of FIGS. 8A and 8B, in which an opaque coating is incorporated between the lens elements.

FIG. 8D is a schematic drawing depicting a variation on the lens arrays 40/41 of FIGS. 8A and 8B, in which an opaque, light absorbing coating 45 is incorporated between the lens elements 42. The light absorbing coating 45 may be deposited between the lens elements 42 as a means of blocking out any light leakage. The light absorbing material may be a black material such as a black emulsion, black chrome, or black ink. The left portion of FIG. 8D shows the lens array 40 with the light absorbing material 45 deposited in the interstitial grooves between the lens elements 42. The right portion of FIG. 8D shows the lens array 41 with the light absorbing material deposited in the gaps 43 between the lens elements 42. One method of depositing a black material in between the lens elements is to spin-coat black ink onto the lens array which allows the ink to flow into the grooves.

In exemplary embodiments of the present invention, an enhanced backlight system may include the barrier and slit structure combined with a lens array to form an optical stack that may be used to provide for enhanced private and public viewing modes in a switchable privacy display system. Generally, a 1D version of barrier and slit structure 30a (parallel strip barriers/slits) may be combined with a lenticular lens array 40a/41a (half-cylinder lens elements). Similarly, a 2D version of barrier and slit structure 30b (grid barrier with aperture slits) may be combined with a micro lens array 40b/41b (half-spherical lens elements).

An aspect of the invention, therefore, includes a display component for controlling a viewing angle in a in switchable privacy display system that achieves a strong private mode and enhanced brightness in the private and public modes as compared to conventional configurations. The display component includes a backlight unit that emits light from a non-viewing side of the display component toward a viewing side of the display component; a barrier and slit structure located on a viewing side of the backlight unit, the barrier and slit structure comprising a plurality of opaque barrier regions interspersed with a plurality of transparent slit regions; and a lens array located on a viewing side of the barrier and slit structure, with the lens array in a separate plane relative to the barrier regions, wherein the barrier and slit structure and the lens array operate to transmit light from the backlight unit collimated in a limited viewing angle range. In exemplary embodiments of the display component, the barrier regions are reflective barrier regions that recycle light emitted from the backlight unit.

FIGS. 9A-9D are schematic drawings depicting various configurations of a backlight system including an optical stack that combines a reflective barrier and slit structure with a lens array. In the examples of FIGS. 9A-9D, the convex side of the lens elements faces toward the barrier and slit structures and thus toward the non-viewing side. The precise configuration of the barrier and slit structure differs with respect to each of the embodiments of the backlight systems of FIGS. 9A-9D.

In the various embodiments of FIGS. 9A-9D, a backlight system 50 is configured as an optical stack that includes a lens array 52 that may be configured in accordance with any of the configurations as described with respect to FIGS. 8A and 8B. The lens array 52 is deposited on a transparent substrate 53, which may be glass or other suitable transparent material usable in displays. With the orientation of the convex side of the lens elements facing toward the barrier and slit structures, an additional substrate 53 gives the lens array desirable rigidity. The lens array 52 is positioned on a viewing side of a barrier and slit structure 54 (a, b, c, or d), with the differences in such structures being described in more detail blow. A spacer 55 may be employed to locate the lens array 52 at an optimal distance relative to the barrier and slit structure. The barrier and slit structure 54 (a, b, c, or d) may be deposited on the viewing side of a brightness enhancement film 56, such as a dual brightness enhancement film (DBEF). The spacer, barrier and slit configuration, and DBEF may be adhered to each other using a suitable optically transparent glue 57. The combination of spacer and glue layer is chosen as optimal for any particular application, and generally glue layer may be very thin, and all glue layers preferably have a refractive index matching adjacent substrates or layers. The total separation "s" between the apex of the lens and the plane of the barrier may be optimized depending on the pitch and height of the lens. In general, it may be desirable for the ratio of the pitch P to the separation "s" to be in the range of 5≥P/s≥1. More preferably, the ratio is in the range of 3.5≥P/s≥1.2 or in the range of 2.7≥P/s≥1.5. The spacing between the lens elements may be filled with a low refractive index medium 58, and power of the lenses is maximized if the low refractive index medium is air or a vacuum. The optical stack 50 further includes a backlight unit 59 (BLU) located on a non-viewing side of the optical stack to act as a light source that emits light from the non-viewing side of the optical stack toward the viewing side of the optical stack.

In exemplary embodiments, the barrier and slit structure includes a reflective material that forms the barrier regions, which may be configured in a variety of ways. In the embodiment of FIG. 9A, the barrier and slit structure 54a is formed from a reflective film, such as for example an enhanced spectral reflection (ESR) film. When employing such a film, slits 62 may be cut out from the film with the barrier regions 60 being the remaining film, or the film may be manufactured to contain the slits between the barriers. In the embodiment of FIG. 9B, the barrier and slit structure 54b is configured to have reflective metal barrier regions 64, such as aluminium or silver barriers. The reflective barrier and slit structure 54b may be fabricated by depositing a reflective metal material such as aluminium or silver onto a transparent substrate 66 to form a patterned metal layer on the substrate with the slits 62 positioned between the metal barrier regions. The substrate 66 may be an optically transparent material such as glass. In the embodiment of FIG. 9C, the barrier and slit structure 54c is formed using silver to form patterned reflective metal barrier regions 68. When employing silver barriers, it is beneficial first to deposit an additional patterned adhesion layer 70 on the substrate 66 to enable stronger adhesion of the patterned silver barrier regions 68 to the substrate. This additional patterned adhesion layer 70 may be an optically thin layer of chrome. As shown in the embodiment of FIG. 9D, to reduce reflections off the top surface of the reflective barriers, a patterned light absorbing material layer 72 may be deposited on the viewing side of reflective barrier regions 74, with the reflective barrier regions 74 being configured according to any of the embodiments. The absorbing material of the patterned light absorbing layer 72 may be a black mask, a black emulsion, black chrome, or any other suitable low reflection material. In the various embodiments, the barrier-slit pattern also may be created by etching away the desired areas of reflective material via photolithography.

FIGS. 10A-10D are schematic drawings depicting alternative configurations of a backlight system 50a, which also is configured as an optical stack that combines a reflective barrier and slit structure with a lens array. These embodiments are comparable to the embodiments of FIGS. 9A-9D, except that in the examples of FIGS. 10A-10D, the convex side of the lens elements faces away from the barrier and slit structure and thus toward the viewing side. In other respects, the embodiments are generally comparable. With the orientation of FIGS. 9A-9D, the lens array substrate may be thick enough to space the lens elements at the desired distance from the barriers, which obviates the need for an additional spacer. Alternatively, the spacer 55 (see FIGS. 10C and 10D) still may be used to achieve the desired separation in combination with a thin layer of glue.

Reflective barriers as described in the various embodiments operate to recycle the light that does not pass through the slits, comparable to a DBEF film recycling polarized light, to boost the amount of light transmitted when placed on a viewing side of the backlight. Using a material with high reflectivity in the visible light range increases the amount of light that is recycled. Comparative measurements of a barrier and slit structure on a backlight show that a highly reflective material such as silver allows for over 80% of the light to be transmitted, as compared to a barrier made out of a black absorbing material which allows for only 35% of light to be transmitted. A Louvre film also only transmits about 35% of light from a backlight. A reflective barrier system, therefore, is advantageous in achieving enhanced light transmission within a privacy display system.

As referenced above, in a lens array and reflective barrier backlight system, the barrier and slit structure is positioned on a viewing side of the backlight, and the lens array is positioned on a viewing side of the barrier and slit structure. It may be desirable that the pitch of the lens array matches the pitch of the barrier and lens structure so that the optical effect is uniform across the backlight system. It may be desirable that there is a small difference in pitches between the lens array and the barrier and slit structure so that optical effect varies across the backlight system. In general, it is desirable that the ratio between lens pitch and barrier pitch for any neighboring lens and barrier elements is in the range 0.9≤pitch ratio≤1.1. For the lens elements to have strong focusing power, there is a large difference in refractive index between the lens array structure and the surrounding medium. Focusing power is strongest when the surrounding medium is air or a vacuum, i.e. the lens array should not be glued to the barrier and slit structure. The DBEF film or other brightness enhancement film may be placed within the optical stack as referenced above, and the DBEF may be most effective when positioned in between the viewing side surface of the BLU and the reflective barriers.

Figure 11:
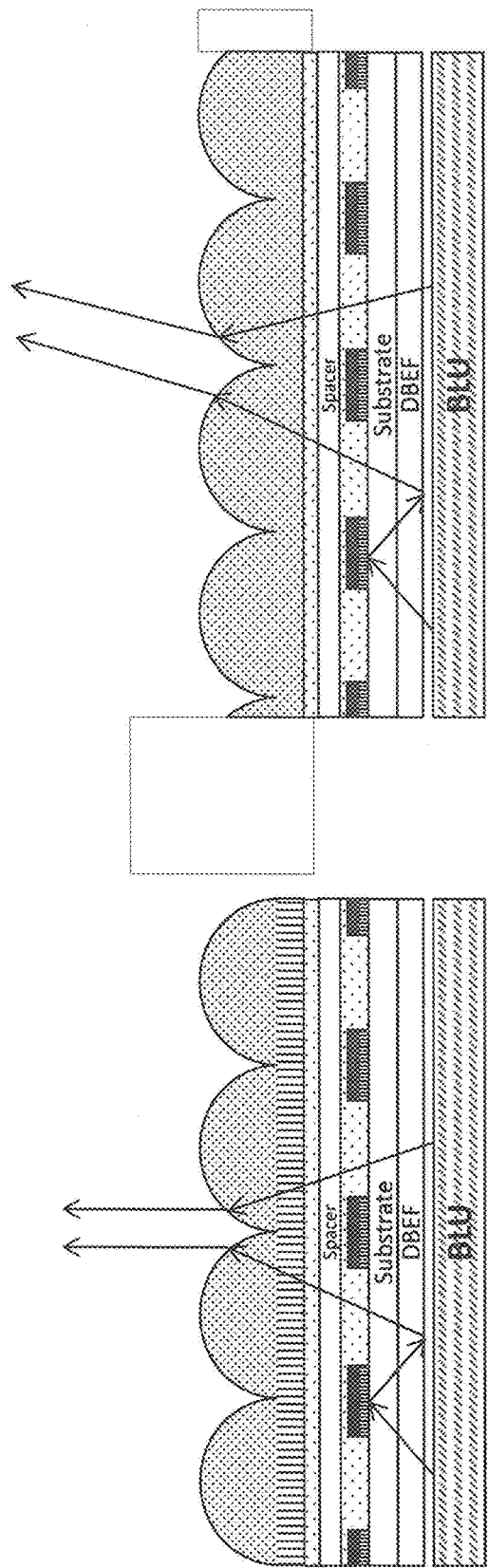
FIG. 11 is a drawing depicting the light recycling function of a backlight system including an optical stack configured in accordance with embodiments of the present invention.

FIG. 11 is a drawing depicting the light recycling function of the reflective barrier structure and lens array system configured in accordance with embodiments of the present invention. FIG. 11 illustrates how a position of the lens elements relative to the barriers and slits affects the direction in which the light is collimated in a narrow or specific viewing angle range. Generally, as shown in the left side portion of FIG. 11, with the centers of the lens elements aligned with the slits, the light is collimated on-axis or perpendicular to the lens array. As shown in the right side portion of FIG. 11, with the centers of the lens elements misaligned with the slits, the light is collimated off-axis relative to the lens array. It will be appreciated the FIG. 11 is illustrative of the overall effect and the exact ray optics may differ. Although FIG. 11 depicts an example using the embodiment of the optical stack of FIG. 10D, comparable principles apply to any of the embodiments. Accordingly, the viewing angle direction of the collimated light can be selected based on the positioning of the lens array relative to the barrier and slit structure, and in particular based on the positioning of the centers of the lens element relative to the slits.

Accordingly, with a lens array and reflective barrier system positioned on the viewing side of a backlight unit, the slits create apertures for the light to be transmitted through. The reflective barriers recycle light that does not pass through the slit apertures in a first pass from the backlight unit, and the lens array focuses or collimates the light that passes through the slit apertures in a particular direction. For a near half-cylinder lenticular or half-sphere micro lens array, the direction in which the light is collimated is dependent on the position of the lens elements relative to the slits. If the center of a lens element is positioned above the center of a slit, then the light will be collimated in a direction perpendicular to the surface of the lens array which corresponds to on-axis collimation (FIG. 11, left portion). If the center of a lens element is not directly above the center of a slit, then the collimation direction will not be perpendicular to the surface of the lens array which corresponds to off-axis collimation (FIG. 11, right portion). Such operation can be used to create a display system with either symmetric privacy or asymmetric privacy modes. Asymmetric privacy may also be achieved by using variations in the shape of the lens elements rather than half cylinder or half-sphere lens elements.

Figure 12:
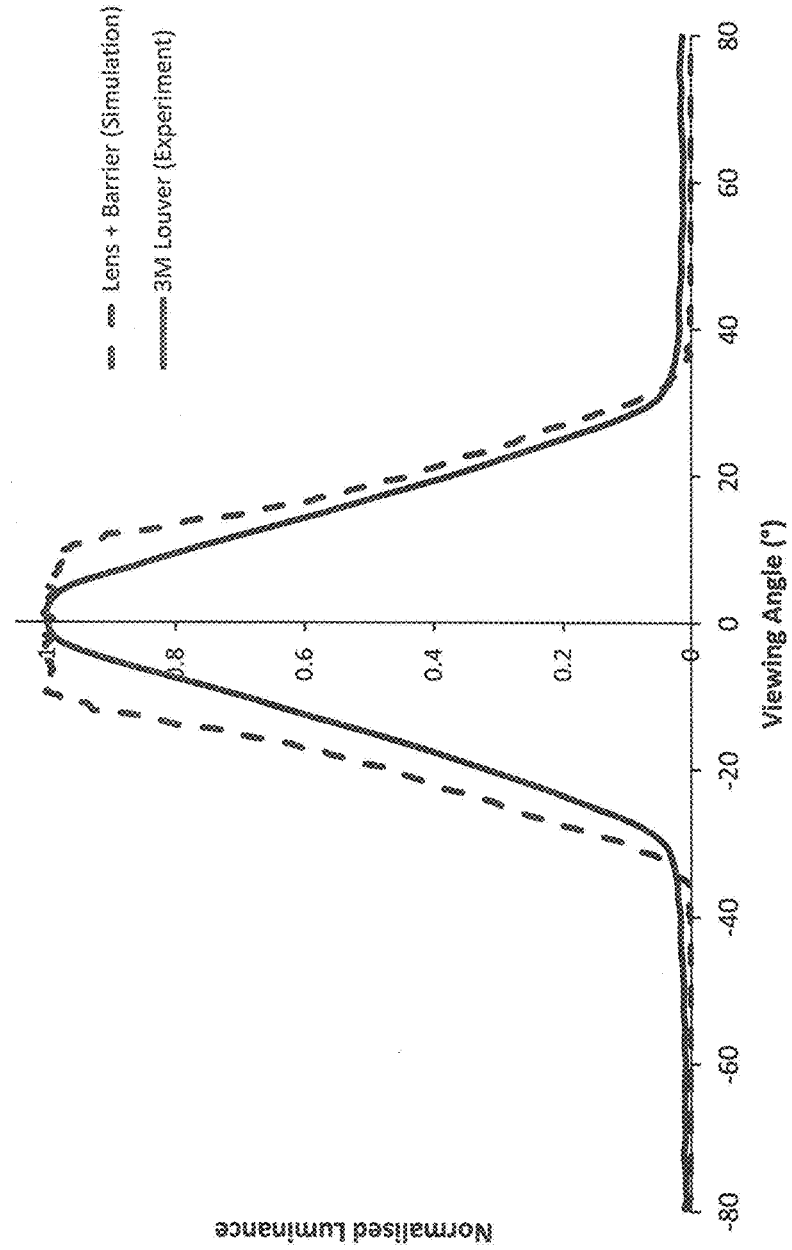
FIG. 12 is a graph depicting performance of a conventional Louvre film versus a lens and reflective barrier system that is configured in accordance with embodiments of the present invention.

FIG. 12 is a graph depicting performance of a conventional Louvre film versus a lens and reflective barrier system that is configured in accordance with embodiments of the present invention. In this example, the lens array and reflective barrier and slit structure are configured to provide on-axis collimation. Both configurations provide for a strong privacy mode with limited off-axis viewing at viewing angles beyond ±40° relative to center. However, within the on-axis desired viewing angle of ±40°, the lens and reflective barrier system of the present invention achieves substantially greater luminance as compared to Louvre films due to the light recycling that is performed by the lens and reflective barrier system as described above.

Figure 13B:
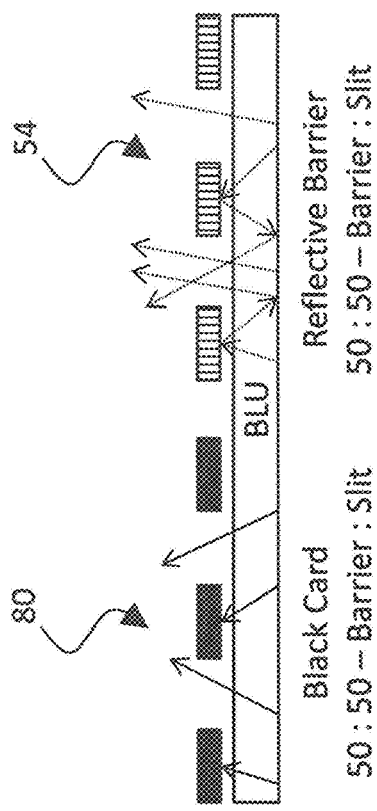
FIG. 13B is a drawing depicting the light transmission using the reflective barrier and slit structure of the present invention versus a conventional black card barrier system.
Figure 13A:
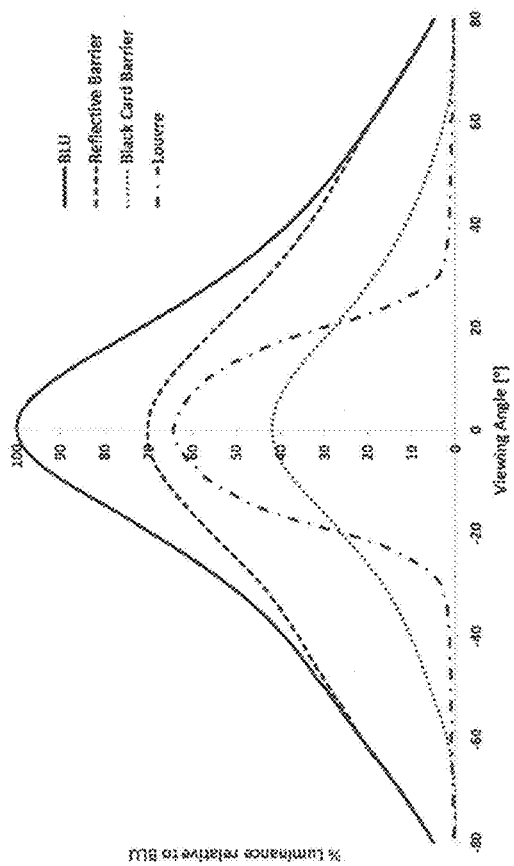
FIG. 13A is a graph depicting luminance performance for the reflective barrier and slit structure of the present invention as compared to a conventional Louvre film and a conventional black card barrier system.

The enhanced performance of the lens and reflective barrier system of the present invention further is illustrated in FIGS. 13A and 13B. In particular, FIG. 13A is a graph depicting luminance performance for the reflective barrier and slit structure of the present invention as compared to a conventional Louvre film and a conventional black card barrier system. FIG. 13B is a drawing depicting the light transmission using the reflective barrier and slit structure 54 of the present invention versus a conventional black card barrier system 80. The graph shows that a reflective barrier and slit structure transmits over 80% of light from the BLU, as compared to 35% transmitted by a black card barrier equivalent and 35% transmitted by a Louvre film. In practice, a black card configuration would not be used in an actual device, but is employed herein as a black carrier equivalent for illustrative purpose to show the enhanced effects of the present invention. In devices, a black barrier would conventionally be made using an absorbing material such as a black emulsion. As shown in FIG. 13B, the enhancement occurs due to the light recycling performed by the reflective barrier and slit structure 54, which is not performed by the black card barrier system 80. The enhanced luminance using reflective barrier and slit structure 54 of the present invention results in a stronger private mode and a brighter public mode as compared to conventional configurations, as further detailed below.

FIGS. 14A and 14B are schematic drawings depicting an exemplary display system 74 in accordance with embodiments of the present invention, in which the privacy optic 27 of FIGS. 5-6 is configured as a reflective barrier and lens array system 50/50a in accordance with any of the embodiments of FIGS. 9A-9D and 10A-10D. Accordingly, although only one example is shown, it will be appreciated that any configuration of the reflective barrier and lens array system 50/50a may be employed as the privacy optic 50/50a in this embodiment. Commensurate with the positioning of the privacy optic as previously described, the privacy optic 50/50a is positioned in between the first and second backlight units 25 and 26, i.e., on a viewing side of the privacy backlight unit 25 and on a non-viewing side of the public backlight unit 26. The image panel 28 is positioned on the viewing side of the public backlight unit 26. As shown in these figures, to enhance brightness of the light emitted from the display system 74, the display system further may include a first DBEF 76 between the first backlight unit 25 and the privacy optic 50/50a, and/or a second DBEF 78 positioned between the second backlight unit 26 and the image panel 28.

Display System Using a HAN Cell or Other LCD Retarder Cell as Privacy Optic

Figure 15B:
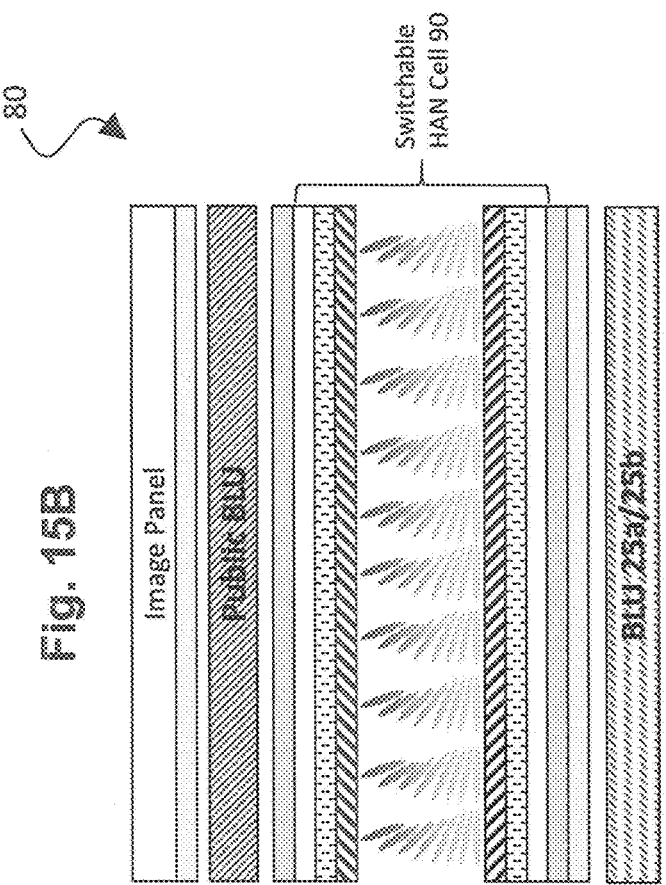
FIG. 15B is a schematic drawing depicting an exemplary display system in accordance with embodiments of the present invention, in which the privacy optic is configured as a switchable HAN LC retarder cell.
Figure 15A:
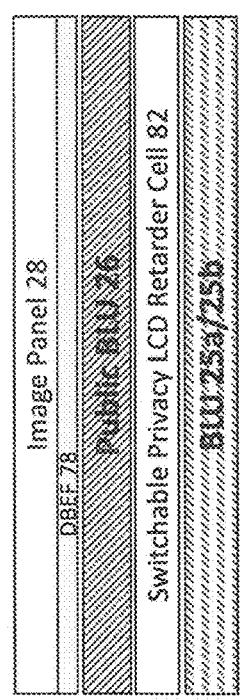
FIG. 15A is a schematic drawing depicting an exemplary display system in accordance with embodiments of the present invention, in which the privacy optic is configured as a switchable LC retarder cell.

FIG. 15A is a schematic drawing depicting an exemplary display system 80 in accordance with embodiments of the present invention, in which the privacy optic 27 of FIGS. 5-6 is configured as a switchable privacy LC retarder cell 82. In an exemplary embodiment as illustrated in FIG. 15B, the switchable privacy LC retarder cell 82 may be configured as a switchable hybrid aligned nematic (HAN) cell 90.

As described in Applicant's '022 Application, which as referenced above is incorporated herein by reference, a hybrid aligned nematic (HAN) LCD cell can be used to provide increased privacy in a display device. As shown in the more detailed HAN cell configuration of FIG. 15B, a view angle control HAN cell 90 may be located between a front (viewing side) polarizer 92 and a rear (non-viewing side) polarizer 94. In general, the HAN cell may 90 include the following components ordered from the viewing side as follows: a first electrode substrate 96 (which may be glass), a first electrode layer 98 (which may be indium tin oxide (ITO)), a first LC alignment layer 100 which may be a vertical alignment layer, a liquid crystal (LC) layer 102, a second alignment layer 104 which may be a planar alignment layer, a second electrode layer 106 (which also may be ITO), and a second electrode substrate 108 (which also may be glass). The configuration of FIG. 15B is representative of a HAN cell, and variations and additional details are described in the '022 Application. For example, the HAN cell may be configured as either a HAN cell including a negative dielectric anisotropy LC material that is switchable between a wide viewing angle mode and a narrow viewing angle mode, or a HAN cell including a positive dielectric anisotropy LC material that is switchable between a narrow viewing angle mode and an even narrower viewing angle mode, although a positive dielectric anisotropy LC material is preferred.

The use of a switchable HAN cell 90 as the privacy optic reduces the amount of light transmitted at off-axis angles. When a small voltage is applied across the HAN cell (e.g., 1-3V), the privacy strength of the HAN cell is increased. Privacy is strongest when the HAN cell is filled with a highly birefringent LC, such as having $\Delta n > 0.2$, and preferably $\Delta n > 0.25$ or $\Delta n > 0.3$ up to about 0.5. The privacy strength of a HAN cell increases with thickness. However, very thick LC cells are difficult to manufacture and are sensitive to pressure. For suitable usages as the privacy optic, the HAN cell thickness may be between 5 μm and 100 μm, and preferably between 15 μm and 50 μm or between 20 μm and 30 μm. For the HAN cell to have the increased privacy function when a small voltage is applied, the LC should have a positive dielectric anisotropy. If an LC with a negative dielectric anisotropy is used, then applying a small voltage will reduce the privacy strength.

Commensurate with the positioning of the privacy optic as previously described, the privacy optic, such as the switchable privacy LC retarder cell 82 or switchable HAN cell 90, is positioned in between the first and second backlight units 25 and 26, i.e., on a viewing side of the privacy backlight unit 25 and on a non-viewing side of the public backlight unit 26. The image panel 28 is positioned on the viewing side of the public backlight unit 26. As shown in FIG. 15B, to enhance brightness of the light emitted from the display system 80, similarly as in the previous embodiment the display system 80 further may include the first DBEF 76 positioned between the first backlight unit 25 and the privacy optic/HAN cell 90, and/or the second DBEF 78 positioned between the second backlight unit 26 and the image panel 28.

For a backlight system employing a privacy backlight unit 25, a HAN cell privacy optic 90, and a public backlight unit 26, the backlight system can be operated in a least four modes as illustrated in the chart of FIG. 16. In a public mode, only the public backlight unit 26 is on, which provides a wide angle viewing range, with the privacy backlight unit and the HAN cell being turned off. In this context, turning the HAN cell off means not applying any voltage to or potential difference across the HAN cell, corresponding to a passive privacy state (0 V applied). In a bright public mode, both the public and the privacy backlight units are on to enhance the brightness, but the HAN cell is turned off so as to avoid the HAN cell from substantially restricting the viewing angle of light emitted from the privacy backlight unit. In the private mode, just the privacy backlight unit is on and a private mode is provided predominantly by the view angle restriction imposed by the privacy backlight unit itself, with a small contribution from the HAN cell as the HAN cell is turned off as is the public backlight unit. In the extra private mode, the privacy backlight unit is on and a small voltage is applied to turn on the HAN cell, which enhances the privacy as the viewing angle restriction is now being imposed by both the privacy backlight unit and a stronger contribution to viewing angle restriction by the HAN cell privacy optic (and again the public backlight unit is turned off).

Figure 17B:
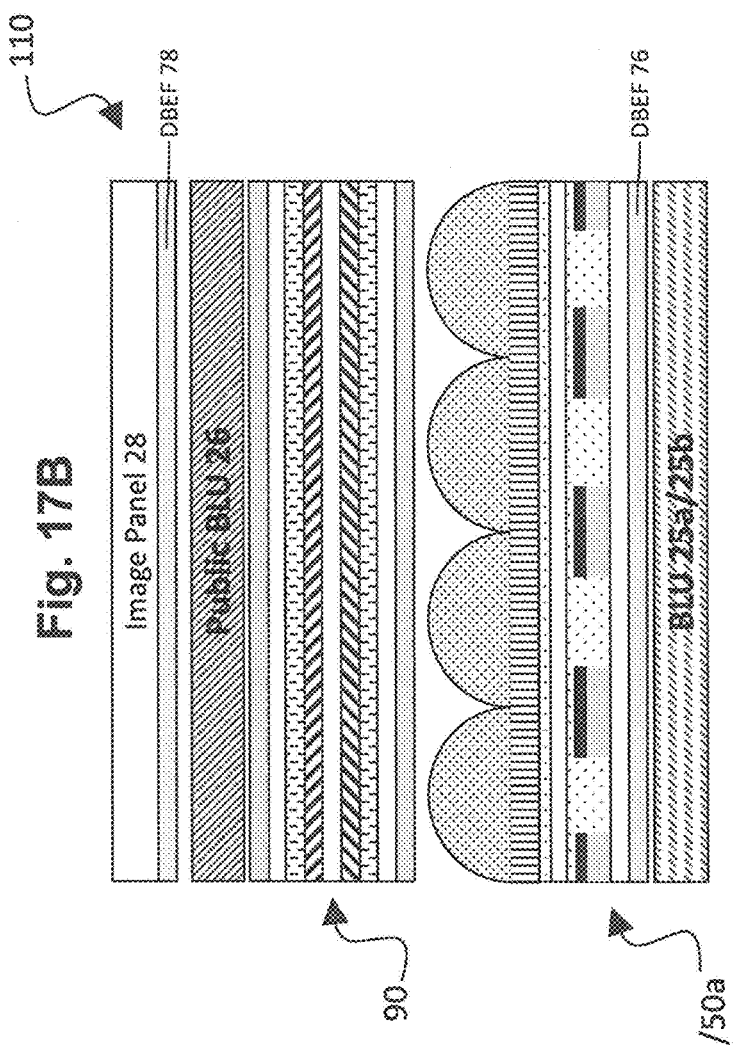
FIGS. 17A and 17B are schematic drawings depicting an exemplary display system in accordance with embodiments of the present invention, in which the privacy optic is configured as a combined reflective barrier and lens array system and a switchable HAN cell.
Figure 17A:
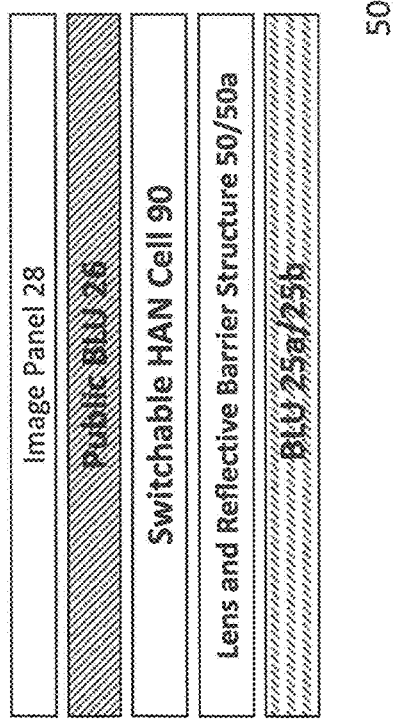

HAN cell privacy may not be strong enough by itself for the stringent requirements of automotive applications, and thus the first backlight unit 25 preferably is a strong privacy backlight unit such as a highly collimated backlight or a standard backlight with a Louvre film, such as in the configurations of FIGS. 6A and 6C described above. In another exemplary embodiment, to enhance the HAN cell privacy operation, the HAN cell can be used in combination with another privacy optic, such for example the lens array and reflective barrier system 50/50a of the previous embodiment. Accordingly, FIGS. 17A (general overview) and 17B (more specific configuration) are schematic drawings depicting an exemplary display system 110 in accordance with embodiments of the present invention, in which the privacy optic 27 of FIGS. 5-6 is configured as a reflective barrier and lens array system 50/50a in accordance with any of the embodiments of FIGS. 9A-9D and 10A-10D, in combination with the HAN cell 90 of FIG. 15B. Again, although one specific example is shown in FIG. 17B, it will be appreciated that any configuration of the reflective barrier and lens array system 50/50a, in combination with any suitable configuration of the privacy LC cell 90, may be employed as the privacy optic in this embodiment.

As another exemplary embodiments, FIGS. 18A and 18B are schematic drawings depicting an exemplary display system 120 in accordance with embodiments of the present invention, in which the privacy optic 27 of FIGS. 5-6 is configured as a splayed film retarder layer 122, which is a fixed film implementation of a privacy LC layer. Such a configuration has a similar structure to the HAN cell, except the privacy optic includes an LC film and thus there is no need for glass substrates and additional alignment layers.

As shown in the more detailed splayed film configuration of FIG. 18B, a splayed film retarder layer 122 may be located between a front (viewing side) polarizer 124 and a rear (non-viewing side) polarizer 126. In general, the splayed film retarder layer 122 may include the following components ordered from the viewing side as follows: a film liquid crystal LC layer 128 which may have native vertical alignment, a single alignment layer 130 which may be a planar alignment layer, and a single substrate 132 which may be a transparent plastic. Commensurate with the positioning of the privacy optic as previously described, the switchable splayed film retarder 122 is positioned between the first and second backlight units 25 and 26, i.e., on a viewing side of the privacy backlight unit 25 and on a non-viewing side of the public backlight unit 26. The image panel 28 is positioned on the viewing side of the public backlight unit 26. As shown in FIG. 18B, to enhance brightness of the light emitted from the display system 120, similarly as in the previous embodiment the display system 120 further may include the first DBEF 76 positioned between the first backlight unit 25 and the privacy splayed film retarder 122, and/or the second DBEF 78 positioned between the second backlight unit 26 and the image panel 28.

An aspect of the invention, therefore, is a backlight system for controlling a viewing angle in a switchable privacy display system that achieves a strong private mode and enhanced brightness in the private and public modes as compared to conventional configurations. In exemplary embodiments, the backlight system includes a first backlight unit that emits light from a non-viewing side of the backlight system toward a viewing side of the backlight system; a second backlight unit located on a viewing side of the first backlight unit that emits light toward the viewing side of the backlight system; and a privacy optic that includes a liquid crystal material and is located on a non-viewing side of the second backlight unit and between the first backlight unit and the second backlight unit, wherein the privacy optic operates to transmit light from the first backlight unit in a limited viewing angle range. The backlight system may include one or more of the following features, either individually or in combination.

In an exemplary embodiment of the backlight system, instead of using an LC material the privacy optic comprises a reflective barrier and lens array system, the reflective barrier and lens array system comprising a barrier and slit structure comprising a plurality of opaque reflective barrier regions interspersed with a plurality of transparent slit regions, and a lens array located on a viewing side of the barrier and slit structure, wherein the reflective barrier and slit structure and the lens array operate to transmit light from the first backlight unit collimated in the limited viewing angle range.

In an exemplary embodiment of the backlight system, the privacy optic comprises a switchable liquid crystal retarder cell, wherein the switchable liquid crystal retarder cell is switchable between a private mode that collimates light from the first backlight unit and a second mode that transmits light at a wider viewing angle as compared to the private mode.

In an exemplary embodiment of the backlight system, the switchable liquid crystal retarder cell comprises a hybrid aligned nematic (HAN) cell.

In an exemplary embodiment of the backlight system, the privacy optic comprises the liquid crystal retarder in combination with a reflective barrier and lens array system located on a non-viewing side of the HAN cell; the reflective barrier and lens array system comprising a barrier and slit structure comprising a plurality of opaque reflective barrier regions interspersed with a plurality of transparent slit regions, and a lens array located on a viewing side of the barrier and slit structure.

In an exemplary embodiment of the backlight system, the HAN cell includes a birefringent liquid crystal (LC) material having $\Delta n > 0.2$ and $\Delta n < 0.5$.

In an exemplary embodiment of the backlight system, the HAN cell has a thickness between 5 µm and 100 µm.

In an exemplary embodiment of the backlight system, the HAN cell includes a positive dielectric anisotropy LC material.

In an exemplary embodiment of the backlight system, the privacy optic comprises a splayed film retarder cell.

In an exemplary embodiment of the backlight system, the first backlight unit is a privacy backlight unit and the second backlight unit is a public backlight unit such that the privacy backlight unit emits light in a narrow viewing angle range as compared to the public backlight unit.

In an exemplary embodiment of the backlight system, the privacy backlight unit comprises a backlight in combination with a Louvre film.

In an exemplary embodiment of the backlight system, the privacy backlight unit comprises one of a turning lens backlight unit or includes a cross brightness enhancement film.

In an exemplary embodiment of the backlight system, the backlight system further includes a front polarizer located on a viewing side of the privacy optic and/or a rear polarizer located on a non-viewing side of the privacy optic.

In an exemplary embodiment of the backlight system, the backlight system further includes a first brightness enhancement film located on a non-viewing side of the privacy optic and/or a second brightness enhancement film located on a viewing side of the privacy optic.

Another aspect of the invention is a switchable privacy display system that is operable in a narrow viewing angle private mode and a wide viewing angle public mode, wherein the display system includes the backlight system according to any of the embodiments in combination with an image panel. The display system may include one or more of the following features, either individually or in combination.

In an exemplary embodiment of the switchable privacy display system, the privacy optic of the backlight system is switchable between a private mode that collimates light from the first backlight unit corresponding to the narrow viewing angle private mode, and a second mode that transmits light at a wider viewing angle as compared to the private mode.

In an exemplary embodiment of the switchable privacy display system, the privacy optic comprises a switchable HAN cell.

In an exemplary embodiment of the switchable privacy display system, the first backlight unit is a privacy backlight unit and the second backlight unit is a public backlight unit such that the privacy backlight unit emits light in a narrow viewing angle range as compared to the public backlight unit.

In an exemplary embodiment of the switchable privacy display system, the display system is operable in: a public mode in which the first backlight unit and the HAN cell are turned off and the second backlight unit is turn on; a bright public mode in which the HAN cell is turned off and the first and second backlight units are turned on; a private mode in which the first backlight unit is turned on and the HAN cell and the second backlight unit are turned off; and an extra private mode in which the first backlight unit and the HAN cell are turned on and the second backlight unit is turned off.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which a strong narrow angle view private mode is desirable in additional to a wide angle view public mode. A strong private mode in particular is desirable for portable electronic display devices that are commonly used in a public setting. Examples of such devices include mobile phones including smartphones, personal digital assistants (PDAs), and tablet and laptop computers. The strength of the privacy mode further is suitable for automotive applications, in which regulatory and general safety considerations require that a driver be unable to view moving image content being viewed by a passenger.

REFERENCE SIGNS LIST

10—liquid crystal device (LCD) configuration
10a—switchable dual backlight system
12—backlight
12a—first privacy backlight
12b—second public backlight
14—light
16—view angle control film
18—LCD image panel
20—enhanced LCD configuration
22—view angle control LCD
22a—additional privacy LCD
22b—switchable scattering privacy LCD
23—privacy display system
23a—privacy display system
23b—privacy display system
23c—privacy display system
24—backlight system
25—first or privacy backlight unit
25a—standard backlight unit
25b—privacy backlight unit
26—second or public backlight unit
27—privacy optic
28—image panel
29—Louvre film
30—barrier and slit structure
30a—barrier and slit configuration
30b—barrier and slit configuration
32—opaque barrier regions
32a—parallel barrier strips
32b—barrier grid
34—transparent slit regions
34a—parallel slits
34b—aperture slits
36—substrate
40—lens array
40a—lenticular lens array
40b—micro-lens array
41—lens array with gags
41a—lenticular lens array
41b—micro-lens array
42—lens elements
42a—strips of lens elements
42b—two-dimensional array of lens elements
43—gaps
43a—gaps
43b—gaps
44—transparent substrate
45—light absorbing coating
50—backlight system
50a—backlight system
52—lens array
53—transparent substrate
54—barrier and slit structure
54a—barrier and slit structure
54b—barrier and slit structure
54c—barrier and slit structure
55—spacer
56—brightness enhancement film
57—optically transparent glue
58—low refractive index medium
59—backlight unit
60—barrier regions 62—slits
64—reflective metal barrier region
66—transparent substrate
68—patterned reflective metal barrier regions
70—patterned adhesion layer
72—patterned light absorbing material layer
74—reflective barrier regions
76—first DBEF
78—second DBEF
80—black card barrier system
82—privacy LC retarder cell
90—switchable hybrid aligned nematic (HAN) cell
92—front (viewing side) polarizer
94—rear (non-viewing side) polarizer
96—first electrode substrate
98—first electrode layer
100—first LC alignment layer
102—liquid crystal (LC) layer
104—second alignment layer
106—second electrode layer
108—second electrode substrate
110—display system
120—display system
122—splayed film retarder layer
124—front (viewing side) polarizer
126—rear (non-viewing side) polarizer
128—film liquid crystal (LC) layer
130—single alignment layer
132—single substrate

What is claimed is:

1. A backlight system for controlling a viewing angle in a switchable privacy display system, the backlight system comprising:
    a first backlight unit that emits light from a non-viewing side of the backlight system toward a viewing side of the backlight system;
    a second backlight unit located on a viewing side of the first backlight unit that emits light toward the viewing side of the backlight system;
    a privacy optic that includes a liquid crystal material and is located on a non-viewing side of the second backlight unit and between the first backlight unit and the second backlight unit, wherein the privacy optic operates to transmit light from the first backlight unit in a limited viewing angle range;
    a first polarizer located on a viewing side of the privacy optic and on a non-viewing side of the second backlight unit; and
    a second polarizer located on a non-viewing side of the privacy optic and on a viewing side of the first backlight unit;
    wherein the privacy optic comprises a switchable liquid crystal retarder cell configured as a hybrid aligned nematic (HAN) cell located between the first polarizer and the second polarizer, the HAN cell including a first substrate having a first electrode layer and a second substrate having a second electrode layer on opposite sides of a liquid crystal layer, and wherein a viewing angle restriction is stronger when a voltage is applied across the HAN cell.

2. The backlight system of claim 1, wherein the privacy optic is switchable between a private mode that collimates light from the first backlight unit and a second mode that transmits light at a wider viewing angle as compared to the private mode.

3. The backlight system of claim 1, wherein the HAN cell includes a birefringent liquid crystal (LC) material having $\Delta n > 0.2$ and $\Delta n < 0.5$.

4. The backlight system of claim 1, wherein the HAN cell has a thickness between 5 μm and 100 μm.

5. The backlight system of claim 1, wherein the HAN cell includes a positive dielectric anisotropy LC material.

6. The backlight system of claim 1, wherein the privacy optic comprises a splayed film retarder cell.

7. The backlight system of claim 1, wherein the first backlight unit is a privacy backlight unit and the second backlight unit is a public backlight unit such that the privacy backlight unit emits light in a narrow viewing angle range as compared to the public backlight unit.

8. The backlight system of claim 7, wherein the privacy backlight unit comprises one of a turning lens backlight unit or includes a cross brightness enhancement film.

9. The backlight system of claim 1, further comprising a first brightness enhancement film located on a non-viewing side of the privacy optic and/or a second brightness enhancement film located on a viewing side of the privacy optic.

10. A switchable privacy display system that is operable in a narrow viewing angle private mode and a wide viewing angle public mode comprising:
    the backlight system according to claim 1; and
    an image panel located on a viewing side of the backlight system.

11. The switchable privacy display system of claim 10, wherein the privacy optic of the backlight system is switchable between a private mode that collimates light from the first backlight unit corresponding to the narrow viewing angle private mode, and a second mode that transmits light at a wider viewing angle as compared to the private mode.

12. The switchable privacy display system of claim 10, wherein the first backlight unit is a privacy backlight unit and the second backlight unit is a public backlight unit such that the privacy backlight unit emits light in a narrow viewing angle range as compared to the public backlight unit.

13. The switchable privacy display system of claim 12, wherein the display system is operable in:
    a public mode in which the first backlight unit and the HAN cell are turned off and the second backlight unit is turn on;
    a bright public mode in which the HAN cell is turned off and the first and second backlight units are turned on;
    a private mode in which the first backlight unit is turned on and the HAN cell and the second backlight unit are turned off; and
    an extra private mode in which the first backlight unit and the HAN cell are turned on and the second backlight unit is turned off.

* * * * *